(12) United States Patent
Schamp

(10) Patent No.: US 9,349,058 B2
(45) Date of Patent: May 24, 2016

(54) VEHICULAR PATH SENSING SYSTEM AND METHOD

(71) Applicant: TK HOLDINGS, INC., Pontiac, MI (US)

(72) Inventor: Gregory Gerhard Schamp, South Lyon, MI (US)

(73) Assignee: TK Holdings, Inc., Auburn Hills, MI (US)

( * ) Notice: Subject to any disclaimer, the term of this patent is extended or adjusted under 35 U.S.C. 154(b) by 0 days.

(21) Appl. No.: 14/439,818

(22) PCT Filed: Oct. 15, 2013

(86) PCT No.: PCT/US2013/065081
§ 371 (c)(1),
(2) Date: Apr. 30, 2015

(87) PCT Pub. No.: WO2014/070448
PCT Pub. Date: May 8, 2014

(65) Prior Publication Data
US 2015/0294161 A1 Oct. 15, 2015

Related U.S. Application Data

(60) Provisional application No. 61/720,564, filed on Oct. 31, 2012, provisional application No. 61/801,449, filed on Mar. 15, 2013.

(51) Int. Cl.
*B60G 17/018* (2006.01)
*B60G 23/00* (2006.01)
(Continued)

(52) U.S. Cl.
CPC .......... *G06K 9/00798* (2013.01); *B60G 17/019* (2013.01); *B60K 31/00* (2013.01);
(Continued)

(58) Field of Classification Search
CPC .......... B60G 2400/252; B60G 17/018; B60G 2400/102; B60G 2500/10; B60G 2400/204
USPC ............................................. 701/37
See application file for complete search history.

(56) References Cited

U.S. PATENT DOCUMENTS 4,700,223 A 10/1987 Shoutaro et al.
4,899,296 A 2/1990 Khattak
(Continued)

FOREIGN PATENT DOCUMENTS

DE 19730414 A1 1/1999
EP 0215948 A1 4/1987
(Continued)

OTHER PUBLICATIONS

R. Zabih and Woodfill, J., "Non-parametric Local Transforms for Computing Visual Correspondence," Proceeding of European Conference on Computer Vision, Stockholm, Sweden, May 1994, pp. 151-158.
(Continued)

*Primary Examiner* — MacEeh Anwari
(74) *Attorney, Agent, or Firm* — Raggio & Dinnin, P.C.

(57) ABSTRACT

At least one fan beam of light (16, 16.1, 16.2) projected along a path (14, 14.1, 14.2, 48) of a vehicle (12) generates a corresponding at least one light stripe (90, 90.1, 90.2) along the surface (14', 48') of the path (14, 48), which is imaged by an imaging system (22, 26) to generate a pair of stereo image components (88', 88") which is processed so as to provide for sensing a physical feature of or along the path (14', 48').

25 Claims, 19 Drawing Sheets

(51) Int. Cl.
| | |
|---|---|
| B62C 3/00 | (2006.01) |
| B62K 25/00 | (2006.01) |
| G06F 7/00 | (2006.01) |
| G06F 17/00 | (2006.01) |
| G06K 9/00 | (2006.01) |
| B60K 31/00 | (2006.01) |
| G01B 11/25 | (2006.01) |
| B60G 17/019 | (2006.01) |
| B60Q 1/04 | (2006.01) |
| B60R 16/023 | (2006.01) |
| G06K 9/46 | (2006.01) |
| H04N 13/02 | (2006.01) |

(52) U.S. Cl.
CPC ............ *B60Q 1/04* (2013.01); *B60R 16/023* (2013.01); *G01B 11/2545* (2013.01); *G06K 9/00791* (2013.01); *G06K 9/46* (2013.01); *H04N 13/02* (2013.01)

(56) References Cited

U.S. PATENT DOCUMENTS

| | | | |
|---|---|---|---|
| 5,163,319 | A | 11/1992 | Spies et al. |
| 5,212,535 | A | 5/1993 | Miyazaki et al. |
| 5,307,136 | A | 4/1994 | Saneyoshi |
| 5,373,446 | A | 12/1994 | Mizukoshi |
| 5,675,489 | A | 10/1997 | Pomerleau |
| 5,835,614 | A | 11/1998 | Aoyama et al. |
| 5,852,672 | A | 12/1998 | Lu |
| 5,937,079 | A | 8/1999 | Franke |
| 5,987,174 | A | 11/1999 | Nakamura et al. |
| 6,028,672 | A * | 2/2000 | Geng ............... G01B 11/022 250/237 G |
| 6,122,597 | A | 9/2000 | Saneyoshi et al. |
| 6,169,572 | B1 | 1/2001 | Sogawa |
| 6,191,704 | B1 | 2/2001 | Takenaga et al. |
| 6,215,898 | B1 | 4/2001 | Woodfill et al. |
| 6,285,778 | B1 | 9/2001 | Nakajima et al. |
| RE37,610 | E | 3/2002 | Tsuchiya et al. |
| 6,456,737 | B1 | 9/2002 | Woodfill et al. |
| 6,477,260 | B1 | 11/2002 | Shimomura |
| 6,947,575 | B2 | 9/2005 | Wallace et al. |
| 6,961,443 | B2 | 11/2005 | Mahbub |
| 6,968,073 | B1 | 11/2005 | O'Boyle et al. |
| 7,046,822 | B1 | 5/2006 | Knoeppel et al. |
| 7,068,815 | B2 | 6/2006 | Chang et al. |
| 7,130,128 | B2 | 10/2006 | Huang et al. |
| 7,397,929 | B2 | 7/2008 | Nichani et al. |
| 7,400,744 | B2 | 7/2008 | Nichani et al. |
| 7,403,659 | B2 | 7/2008 | Das et al. |
| 7,406,181 | B2 | 7/2008 | O'Boyle et al. |
| 7,493,202 | B2 | 2/2009 | Demro et al. |
| 8,594,370 | B2 | 11/2013 | Schamp et al. |
| 2005/0169530 | A1 | 8/2005 | Nakai et al. |
| 2007/0041099 | A1 | 2/2007 | Huang et al. |
| 2008/0240547 | A1 | 10/2008 | Cho et al. |
| 2008/0253606 | A1 | 10/2008 | Fujimaki et al. |
| 2009/0010495 | A1 | 1/2009 | Schamp et al. |
| 2009/0097038 | A1 | 4/2009 | Higgins-Luthman et al. |
| 2011/0311108 | A1 | 12/2011 | Badino et al. |
| 2012/0045119 | A1 | 2/2012 | Schamp |

FOREIGN PATENT DOCUMENTS

| | | |
|---|---|---|
| JP | 2007278951 A | 10/2007 |
| WO | 2006014974 A2 | 2/2006 |
| WO | WO2006/014974 A2 * | 2/2006 |
| WO | 2011069191 A1 | 6/2011 |
| WO | 2014070448 A1 | 5/2014 |

OTHER PUBLICATIONS

J Woodfill and B, Von Herzen, "Real-time stereo vision on the Parts reconfigurable computer," Proceedings of The 5th Annual IEEE Symposium on Field Programmable Custom Computing Machines, (Apr. 1997).

Konolige, K., "Small Vision Systems: Hardware and Implementation," Proc. Eighth Int'l Symp. Robotics Research, pp. 203-212, Oct. 1997.

Baik, Y.K; Jo, J.H.; Lee K.M., "Fast Census Transform-based Stereo Algorithm using SSE2," in The 12th Korea-Japan Joint Workshop on Frontiers of Computer Vision, Feb. 2-3, 2006, Tokushima, Japan, pp. 305-309.

Kim, J.H. Kim; Park, C.O.; Cho, J. D., "Hardware implementation for Real-time Census 3D disparity map Using dynamic search range," Sungkyunkwan University School of Information and Communication, Suwon, Korea, (downloaded from vada.skku.ac.kr/Research/Census.pdf on Dec. 28, 2011).

Unknown Author, "3d Stereoscopic Photography," downloaded from http://3dstereophoto.blogspot.com/2012/01/stereo-matching-local-methods.html on Oct. 19, 2012.

Szeliski, "Stereo Matching," downloaded from www.cvg.ethz.ch/teaching/2010fall/compvis/lecture/vision06b.pdf on Oct. 19, 2012.

International Search Report and Written Opinion of The International Searching Authority in International Application No. PCT/US2013/065081, Jan. 9, 2014, 10 pages.

International Preliminary Report on Patentability in International Application No. PCT/US2013/065081, Dec. 1, 2014, including amended claims sheets and Amendment Under PCT Article 34 filed on Aug. 20, 2014, 39 pages.

International Search Report and Written Opinion of the International Searching Authority in International Application No. PCT/US2014/027376, May 8, 2015, 20 pp.

R. Singh et al., "Laser Dot-Matrix Based Digital System for Monitoring Textureless Roof Strata of Mines", International Archives of Photogrammetry and Remote Sensing, vol. XXXI Part B5, 1996, Jul. 9, 1996, pp. 540-545, XP055147394.

R. Singh et al., "Digital Photogrammetry for Automatic Close Range Measurement of Texturelss and Featurelss Objects", Photogrammetric Record, vol. 15, No. 89, Apr. 1, 1997, pp. 691-702, XP055146917.

R. Mautz et al., "Survey of optical indoor positioning systems", IEEE 2011 International Conference on Indoor Positioning and Indoor Navigation, Sep. 21, 2011, pp. 1-7, XP031990140.

C. Mascarenhas, "Active Light for a Small Planetary Rover", Masters Thesis, Luleå University of Technology, Jan. 1, 2008, pp. 1-109, XP055184044.

F. J. Menendez et al., "A Correction Algorithm for Distorted Laser Images", The Journal of the Society for Art and Science, vol. 8, No. 1, Jan. 1, 2009, pp. 1-14, XP055184051.

* cited by examiner

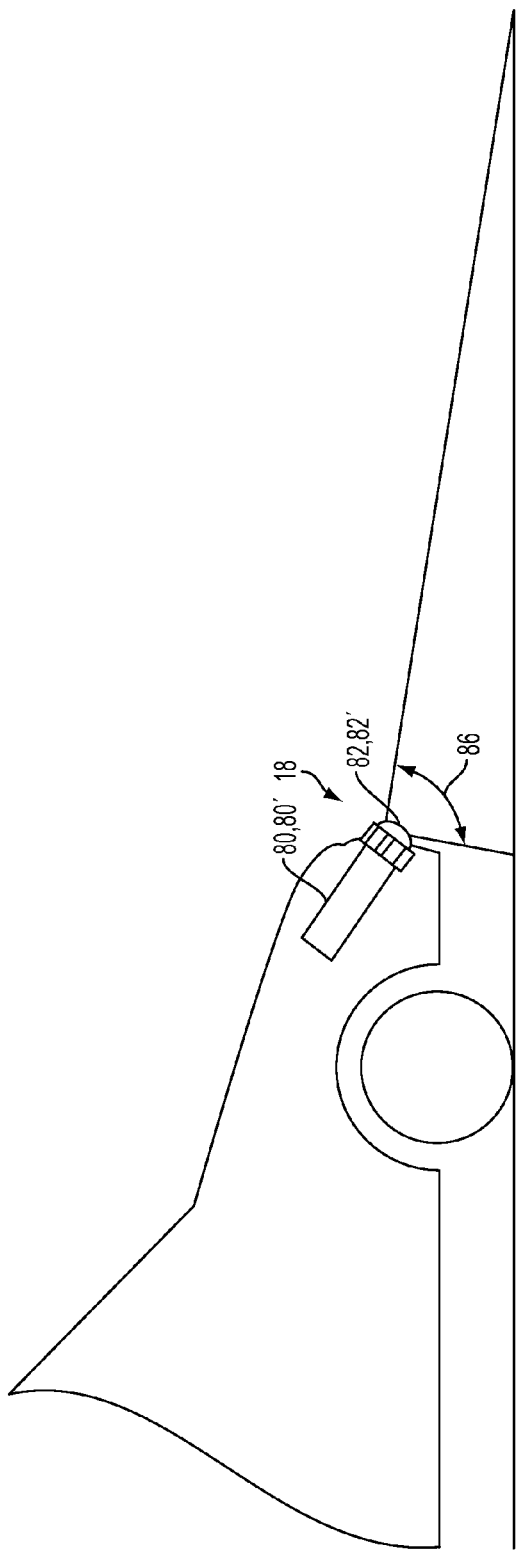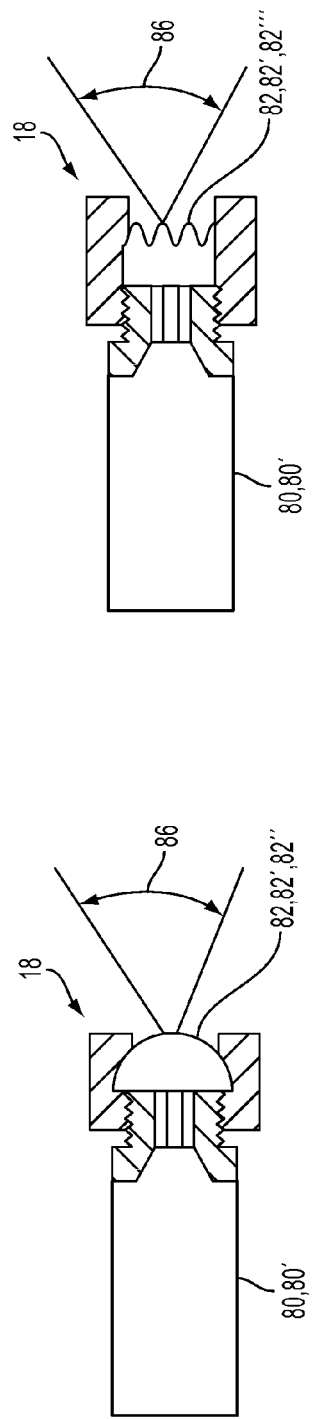

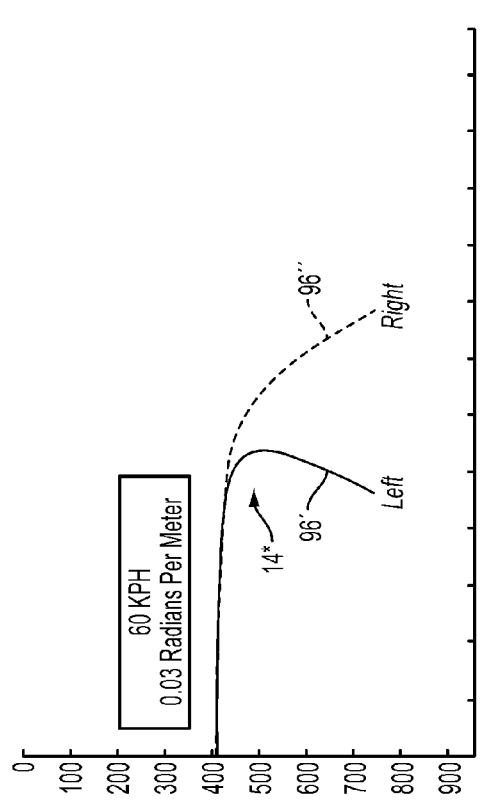
FIG. 19
FIG. 18
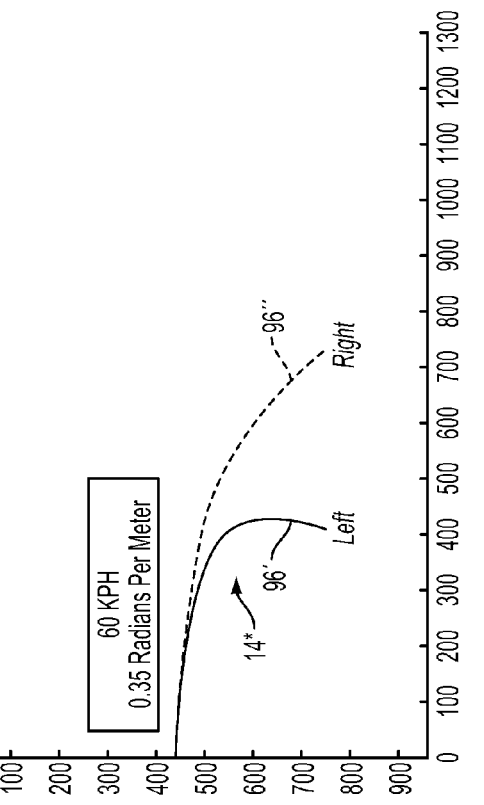
FIG. 20
FIG. 21

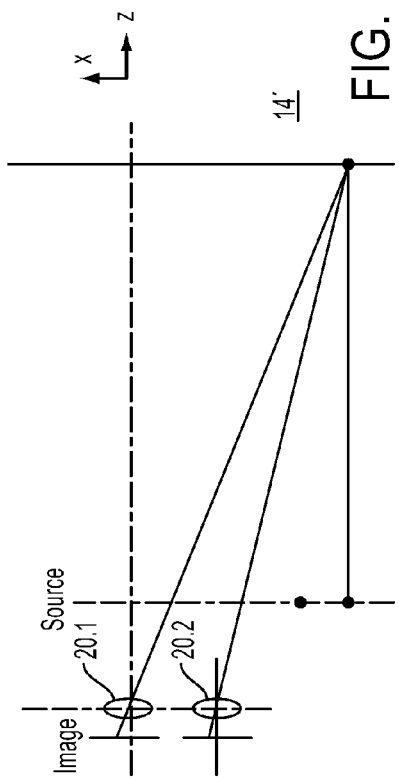
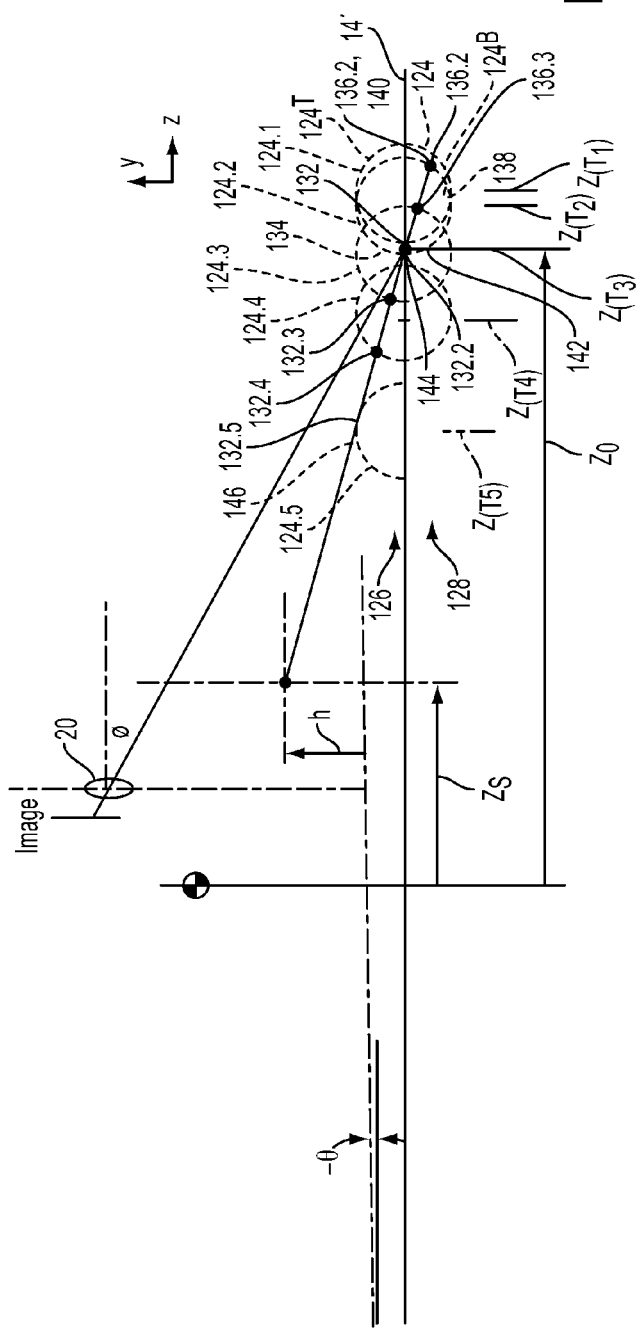

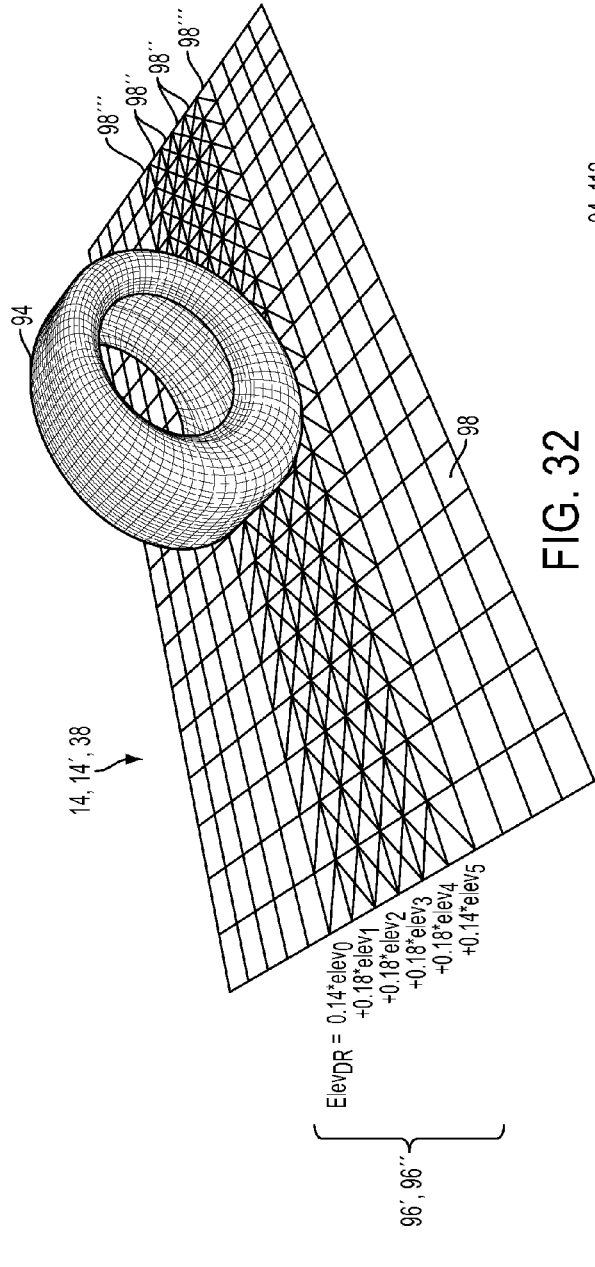
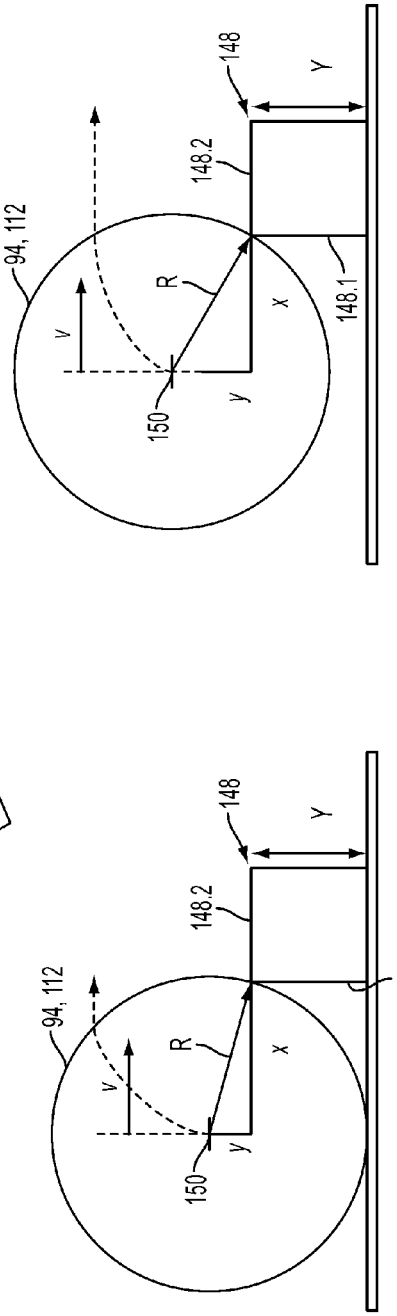
FIG. 32
FIG. 33a
FIG. 33b

VEHICULAR PATH SENSING SYSTEM AND METHOD

CROSS-REFERENCE TO RELATED APPLICATIONS

The instant application claims the benefit of both prior U.S. Provisional Application Ser. No. 61/720,564 filed on 31 Oct. 2012, and prior U.S. Provisional Application Ser. No. 61/801,449 filed on 15 Mar. 2013. Each of the above-identified applications is incorporated herein by reference in its entirety.

BRIEF DESCRIPTION OF THE DRAWINGS

FIG. 7 illustrates a side view of light projection system installed in a vehicle, generating an associated fan beam of light;

FIG. 8a illustrates a fragmentary cross-sectional view of a first embodiment of a light projection system comprising a cannonical piano-cylindrical lens in cooperation with a laser so as to provide for generating a fan beam of light;

FIG. 8b illustrates a fragmentary cross-sectional view of a second embodiment of a light projection system comprising a Fresnel cylindrical lens in cooperation with a laser so as to provide for generating a fan beam of light;

FIG. 18 illustrates a geometry of the curved path of a vehicle centerline in real space together with associated front and rear tire locations;

FIG. 19 illustrates projected left and right tire tracks in image space, for a curvature of about 0.03 radians per meter;

FIG. 20 illustrates projected left and right tire tracks in image space, for a curvature of about 0.35 radians per meter;

FIG. 21 illustrates projected left and right tire tracks in image space, for a curvature of about 0.90 radians per meter;

FIG. 25 illustrates an elevation view geometry of a vehicular path sensing system;

FIG. 26 illustrates a plan view geometry of the vehicular path sensing system, corresponding to elevation view illustrated in FIG. 25;

FIG. 32 illustrates a tire on an associated tire track along a plurality of associated tiles, together with associated weighting factors used to determine the effective tire elevation responsive to the associated tile elevations;

FIG. 33a illustrates a tire abutting an obstruction, and a geometry of associated motion of the wheel; and FIG. 33b illustrates the tire of FIG. 33a in the process of beginning to move over the obstruction.

DESCRIPTION OF EMBODIMENT(S)

Figure 1:
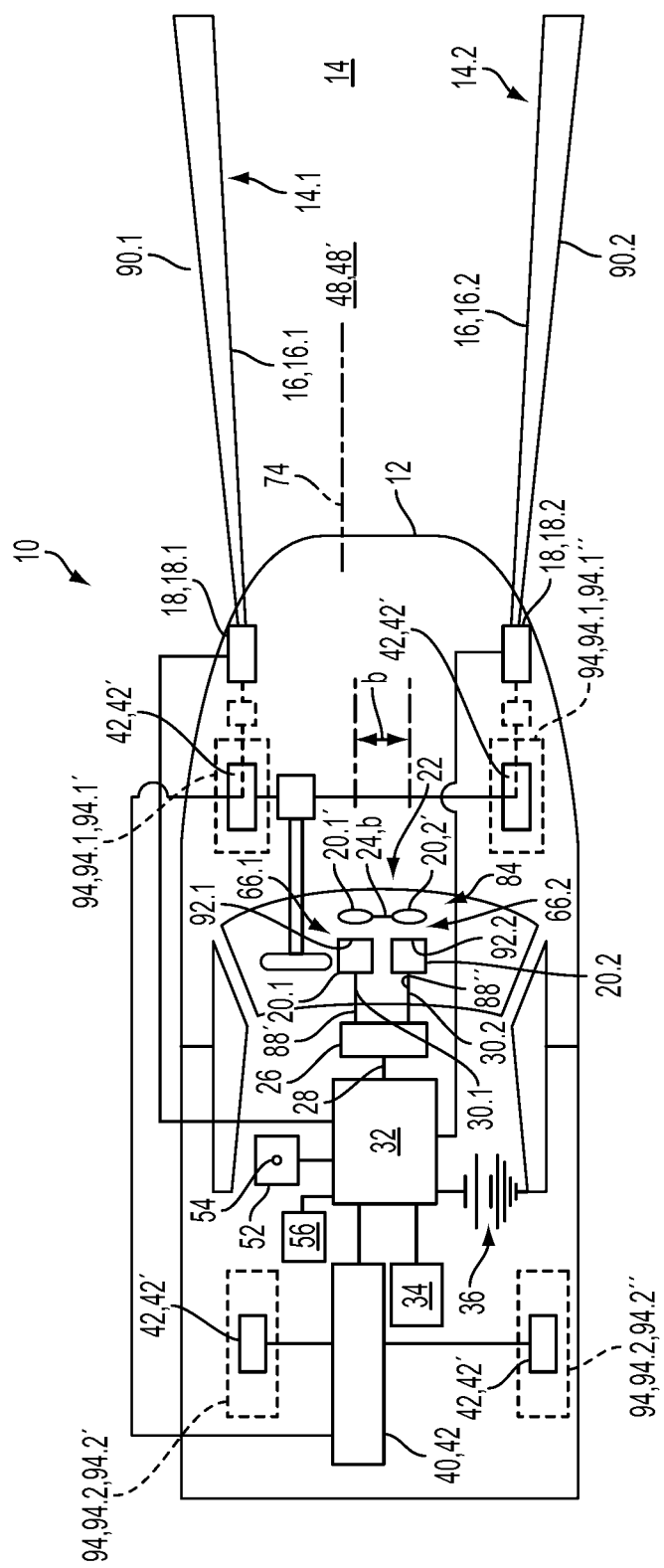
FIGS. 1 and 2 respectively illustrate top and side views of a vehicle incorporating a vehicular path sensing system.
Figure 2:
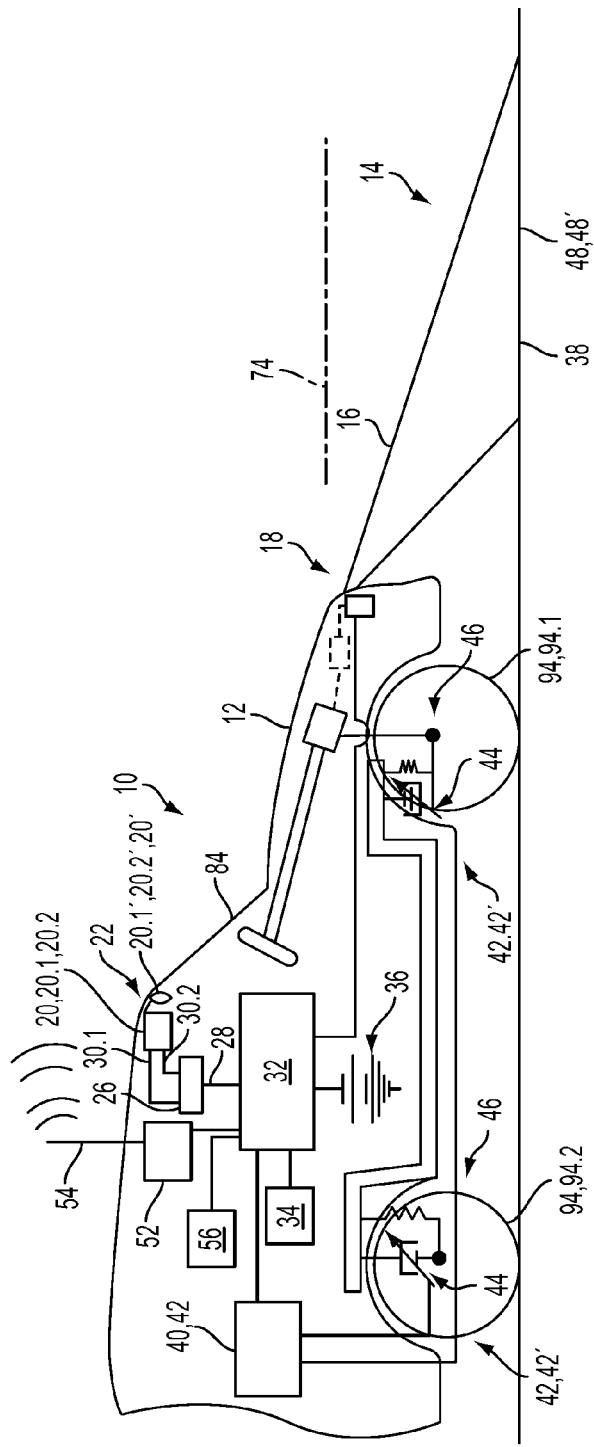

Referring to FIGS. 1 and 2, a vehicular path sensing system 10 incorporated in a vehicle 12 provides for sensing a physical feature of or along a portion 14.1, 14.2 of an associated path 14 thereof illuminated by at least one fan beam of light 16, 16.1, 16.2 projected therealong by an associated light projection system 18, 18.1, 18.2, and imaged by first 20.1 and second 20.2 cameras of a stereo vision system 22 that incorporate associated lenses 20.1', 20.2' separated by an associated baseline distance b along an image system baseline 24 and. An associated stereo vision image processor 26 operatively coupled to the first 20.1 and second 20.2 cameras provides for generating a range map image 28 from the corresponding associated individual first 30.1 and second 30.2 images generated by the corresponding first 20.1 and second 20.2 cameras. The range map image 26 is then processed by an image processor 32—incorporating or operatively coupled to a memory element 34 and powered by a source of power 36—that provides for generating measure of an elevation profile 38 of the portion 14.1, 14.2 of the associated path 14. For example, in one set of embodiments, the stereo vision system 22 and associated stereo vision image processor 26 are constructed and operated in accordance with the teachings of U.S. application Ser. No. 13/465,059 (hereinafter, "Application '059") (5701-01338), filed on 7 May 2012, which is incorporated by reference.

For example, in one set of embodiments, the elevation profile 38 is input to a suspension controller 40 of an electronic suspension control system 42, for example, a variable-damping electronic suspension control system 42' so as to provide for controlling responsive thereto one or more associated controllable dampers 44 of the suspension system 46 of the vehicle 12.

Figure 3:
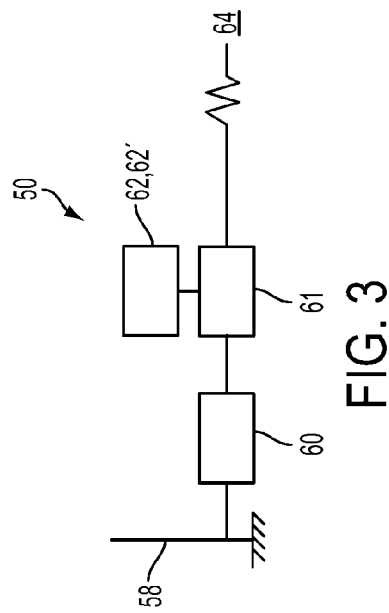
FIG. 3 illustrates a base station in communication with the vehicle illustrated in FIGS. 1 and 2.

As another example, referring also to FIG. 3, in another set of embodiments, additionally or alternatively, for when the path 14 of the vehicle 12 is along a roadway 48, the vehicular path sensing system 10—for example, the image processor 32 thereof—provides for monitoring the elevation profile 38 for substantial deviation from relative smoothness as might result from unwanted disturbances to the roadway surface 48', for example, as might result from either potholes in or objects on the roadway surface 48', and provides for communicating the nature of the disturbance together with the location thereof to a base station 50 via a wireless transmitter 52 and associated transmitting antenna 54, for example, operatively coupled to the image processor 32. For example, the location of the disturbance may be determined from an associated GPS navigation system 56 operatively coupled to the image processor 32. In one embodiment, the base station 50 incorporates a receiving antenna 58 operatively coupled to a wireless receiver 60 that in turn is operatively coupled to a processor 61 in communication with an associated database 62' in memory 62 so as to provide for adding previously unreported disturbances to the database 62' and for communicating disturbances to others, for example, via the Internet 64, for example, so as to automatically provide for notifying relevant authorities of needed repairs or for notifying other drivers of the detected disturbances, for example, via updates to one or more associated map databases used by the other drivers.

Figure 4:
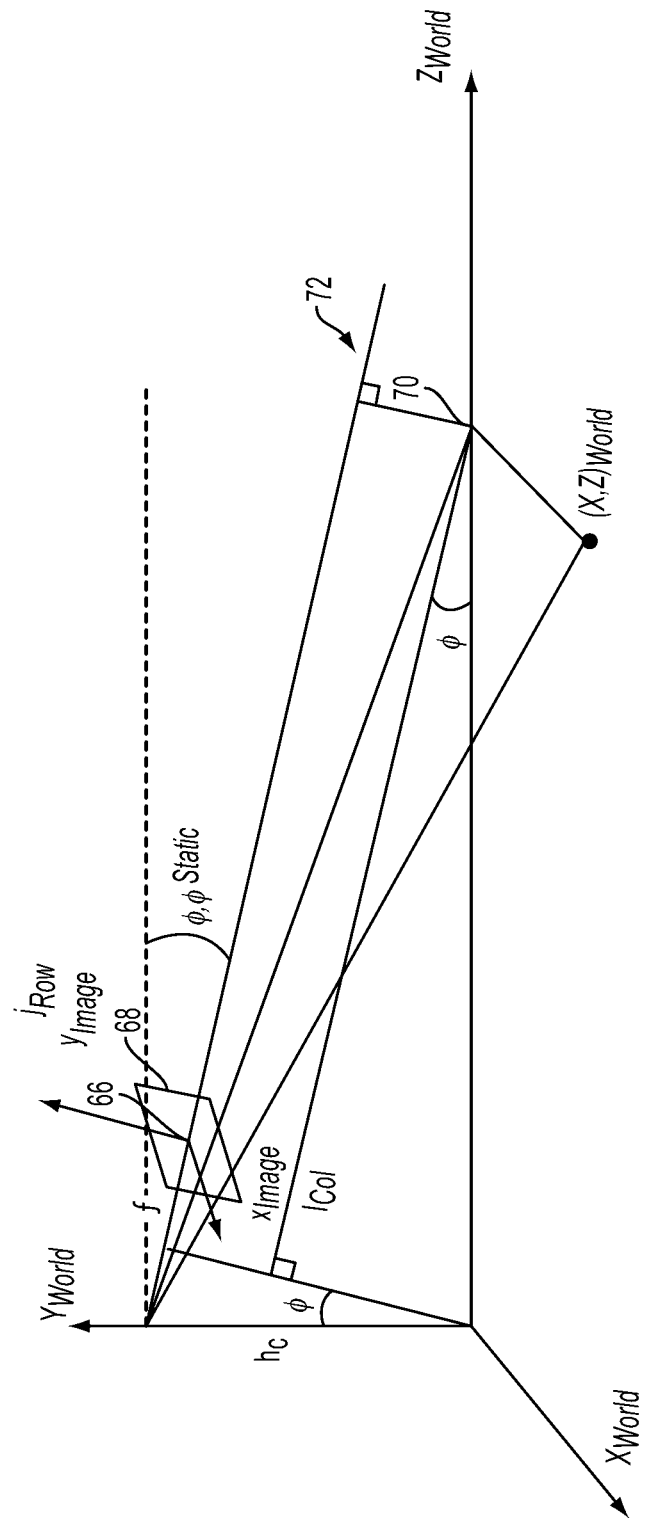
FIG. 4 illustrates the geometry of single camera of an imaging system of a vehicular path sensing system.

Referring to FIG. 4, the geometry of each camera 20.1, 20.2 and associated lens 20.1', 20.2' provides for relating the horizontal $X_{Image}$ and vertical $Y_{Image}$ coordinates of an image point 66 in image space 68 (e.g., in units of pixels),—and associated column $I_{COL}$ and row $J_{ROW}$ coordinates thereof—to corresponding cross-range $X_{World}$, down-range $Z_{World}$ and elevation $Y_{World}$ coordinates of a corresponding real-world point 70 in real space 72, by a flat-earth model, wherein the down-range coordinate $Z_{World}$ is measured from the plane of the focal plane arrays (FPA) of the first 20.1 and second 20.2 cameras, positive forward, and the cross-range coordinate $X_{World}$ is measured from the center of the image system baseline 22, positive rightwards. The transformation from real space 72 to image space 68 is given by:

$$X_{Image} = \frac{f_X \cdot X_{World}}{Z_{World} \cdot \cos(\varphi) + (h_C - Y_{World}) \cdot \sin(\varphi)}, \quad (1)$$

which has a corresponding column coordinate $I_{COL}$ given by:

$$I_{COL} = X_{Image} + \frac{N_{COLS}}{2} + .5; \text{ and} \quad (2)$$

$$Y_{Image} = \frac{f_Y \cdot (Z_{World} \cdot \sin(\varphi) - (h_C - Y_{World}) \cdot \cos(\varphi))}{Z_{World} \cdot \cos(\varphi) + (h_C - Y_{World}) \cdot \sin(\varphi)}; \quad (3)$$

which has a corresponding row coordinate $J_{ROW}$ given by:

$$J_{ROW} = -Y_{Image} + \frac{N_{ROWS}}{2} + .5, \quad (4)$$

wherein $f_X$ and $f_Y$ are measures of the focal length of the camera lens 20' (e.g. in units of pixels) that provide for separate calibration along each separate dimension of the image, $h_C$ is the height of the camera 20 (i.e. the center of the imaging sensor thereof) above the flat earth, i.e. above a flat roadway surface 48', and $\varphi$ is the pitch angle of the camera 20 relative to horizontal (positive downwards from horizontal, for example, in one embodiment, when the vehicle 12 is level, the camera 20 is pitched downwards by about 6 degrees, which is designated as the static camera pitch angle $\varphi^{Static}$, i.e. $\varphi^{Static}$=6 degrees), and the elevation $Y_{World}$ is the distance above the flat roadway surface 48', so that $Y_{World}>0$ for a real-world point 70 above the roadway surface 48', and $Y_{World}<0$ for a real-world point 70 below the roadway surface 48'.

The corresponding inverse transformation from image space 68 to real space 72 is given by:

$$X_{World} = \frac{(h_C - Y_{World}) \cdot X_{Image}}{f_X \cdot \sin(\varphi) - Y_{Image} \cdot \cos(\varphi)}, \text{ and} \quad (5)$$

$$Z_{World} = \frac{(h_C - Y_{World}) \cdot (f_Y \cdot \cos(\varphi) + Y_{Image} \cdot \sin(\varphi))}{f_Y \cdot \sin(\varphi) - Y_{Image} \cdot \cos(\varphi)}, \text{ or} \quad (6)$$

$$Y_{World} = h_C - \frac{Z_{World} \cdot (f_Y \cdot \sin(\varphi) - Y_{Image} \cdot \cos(\varphi))}{f_Y \cdot \cos(\varphi) + Y_{Image} \cdot \sin(\varphi)}. \quad (7)$$

using, from equations (2) and (4):

$$X_{Image} = I_{COL} - \frac{N_{COLS}}{2} - .5; \text{ and} \quad (8)$$

$$Y_{Image} = \frac{N_{ROWS}}{2} + .5 - J_{ROW}, \quad (9)$$

The coordinate system of real space 72 is centered with respect to the camera(s) 20, 20.1, 20.2, and oriented so that Z is parallel to the longitudinal axis 74 of the vehicle 12 and increases away from the camera(s) 20, 20.1, 20.2, X increases rightwards, and Y increases upwards. Per equations (2) and (4), the origin 68.0 of image space 68 is located in the upper-left corner, wherein the row $J_{ROW}$ and column $I_{COL}$ coordinates at the center of image space 68, i.e. at $I_{COL}=N_{COLS}/2$ and $J_{ROW}=N_{ROWS}/2$, correspond to corresponding image coordinate values of $X_{IMAGE}=0$ and $Y_{IMAGE}=0$, wherein the column coordinate $I_{COL}$ increases with increasing values of the value of corresponding image coordinate $X_{IMAGE}$, and the row coordinate $J_{ROW}$ decreases with increasing values of the value of corresponding image coordinate $Y_{IMAGE}$. Accordingly, from equation (3), for a given value of elevation $Y_{World}$, for increasing values of down-range coordinate $Z_{World}$, the corresponding image coordinate $Y_{IMAGE}$ increases and the corresponding row coordinate $J_{ROW}$ decreases, whereas for a given value of down-range $Z_{World}$, for increasing values of elevation $Y_{World}$, the image coordinate $Y_{IMAGE}$ increases, and the corresponding row $J_{ROW}$ decreases.

Figure 5:
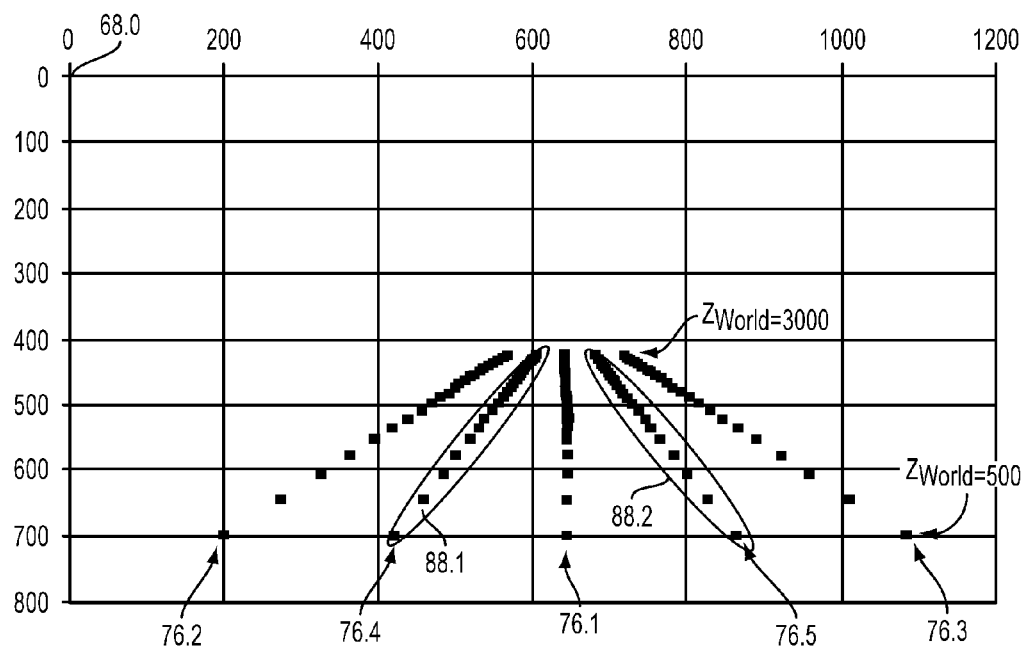
FIG. 5 illustrates various loci of points in image space for several corresponding fixed cross-range values in real space, each for a range of down-range values in real space and a fixed value of elevation along a level roadway surface.
Figure 6:
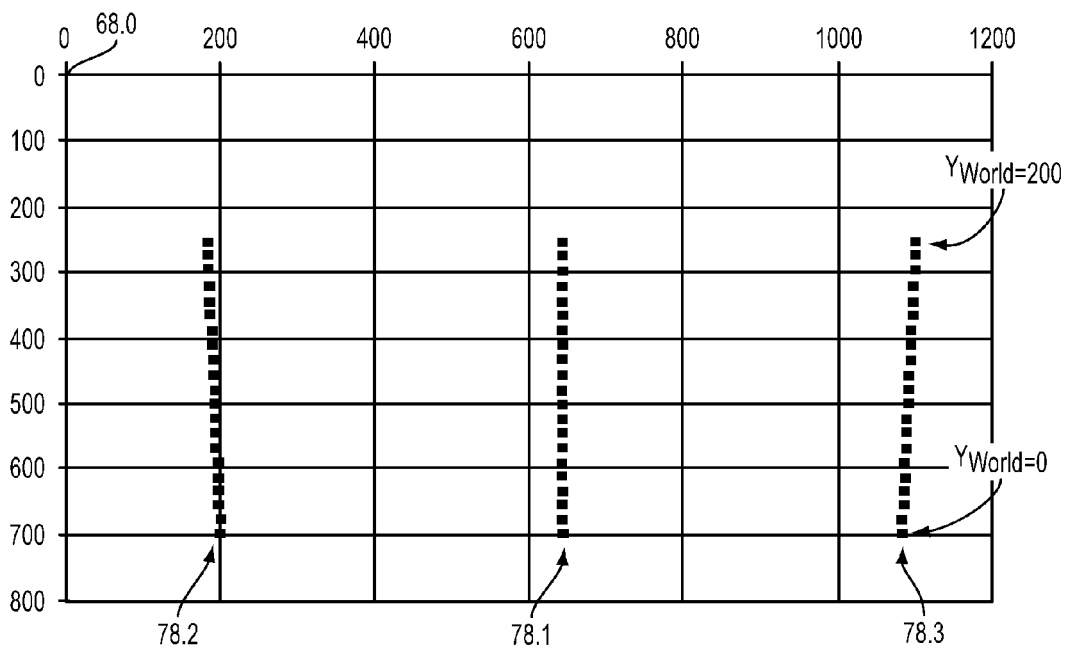
FIG. 6 illustrates three loci of points in image space for corresponding fixed cross-range values in real space, each for a range of elevation values in real space and a fixed down-range value.

For example, using equations (1)-(4), for values of $f_X=f_Y=1130$ pixels, $h_C=150$ cm, $\phi=5.9$ degrees, $N_{COLS}=1280$ and $N_{ROWS}=964$, referring to FIG. 5, for values of elevation $Y_{World}=0$ in real space 72, i.e. points on an associated level roadway surface 48', a first 76.1, second 76.2 and third 76.3 loci of points in image space 68 respectively correspond to respective values in real space 72 at values of cross-range coordinate $X_{Image}$ of $X_{Image}=0$, $X_{Image}=-200$ cm and $X_{Image}=+200$ cm, each for values of down-range coordinate $Z_{World}$ every 100 cm from 500 cm to 3000 cm, illustrating the effect of perspective in the associated image 24. Similarly, referring to FIG. 6, for values of down-range $Z_{World}=500$ cm in real space 72, i.e. points relatively close to the vehicle 12, a first 78.1, second 78.2 and third 78.3 loci of points in image space respectively correspond, in real space 72, to respective values of cross-range of $X_{Image}=0$, $X_{Image}=-200$ cm and $X_{Image}=200$ cm, each for values of elevation coordinate $Y_{World}$ every 10 cm from 0 cm to 200 cm.

Accordingly, for a given height $h_C$ of the camera 20, 20.1, 20.2 above the flat roadway surface 48', the row position $J_{ROW}$ of the image point 66 is directly responsive to the associated down-range coordinate $Z_{World}$ of the corresponding real-world point 70. Relative to that of a flat roadway surface 48', the location of a real-world point 70 encountering a dip in the roadway surface 48' is relatively farther and relatively lower so that the corresponding row $J_{ROW}$ location of the associated image point 66 is relatively lower. Similarly, relative to that of a flat roadway surface 48', the location of a real-world point 70 encountering a bump in the roadway surface 48' is relatively closer and relatively higher so that the corresponding row $J_{ROW}$ location of the associated image point 66 is relatively higher.

Referring to FIG. 7, each fan beam of light 16, 16.1, 16.2 is generated by a corresponding light projection system 18, 18.1, 18.2, each comprising a laser light source 80 in cooperation with associated optics 82 that provides for shaping the fan beam of light 16, 16.1, 16.2. For example, in one embodiment, the laser light source 80 comprises a 780 nanometer Class IIIb laser diode 80' capable of operating at 75 milliwatts maximum power. Generally the laser light source 80 could operate at wavelengths that are either visible or invisible to the human eye, but which are otherwise detectable by the photoelectric material of the associated first 20.1 and second 20.2 cameras of the stereo vision system 22. Furthermore, the laser light source 80 could be operated either continuously or pulsed. Each fan beam of light 16, 16.1, 16.2 is directed downwards toward the roadway 48, thereby substantially reducing the likelihood of inadvertent viewing by a person for an period of time that is sufficient to cause injury to the eye. Typically, the associated beams of light 52 will not be visible, even when operating at visible wavelengths. The optically-transmissive material for the automotive windshield 84 would be adapted so as to provide for sufficient transmissivity at the operating wavelength of the laser light source 80 so as to provide for detection of the fan beams of light 16, 16.1, 16.2 by the first 20.1 and second 20.2 cameras. Generally, the laser diode 80' of the light projection system, 18, 18.1, 18.2 could be any such device qualified for automotive applications. For example, a Class IIIb laser diode 80' operating at 500 nanometers and capable of 200 milliwatts of maximum power would provide for a relatively extended detection distances of approximately 12 meters day or night.

For example, referring to FIG. 7, in accordance with one set of embodiments embodiment, the laser light source 80 and associated optics 82 are part of an associated light projection system assembly 18' which points forwards and downwards so as to reduce the possibility of inadvertently projecting the fan beam of light 16, 16.1, 16.2 into the eye of an observer. For example, the optics 82 comprises a cylindrical lens 82' that is oriented so as to provide for optical power in a direction parallel to the longitudinal axis 74 of the vehicle 12, and substantially no optical power in a transverse direction. For example, FIG. 8a illustrates a side view of a cannonical piano-cylindrical lens 82', 82" and FIG. 8b illustrates a side view of a Fresnel cylindrical lens 82', 82", the latter of which, for example, is available at the following internet web site: www.aixiz.com->Catalogue->Specialty Lenses. For example, in one set of embodiments, the cylindrical lens 82' has a 120 degree field-of-view 86.

Figure 9:
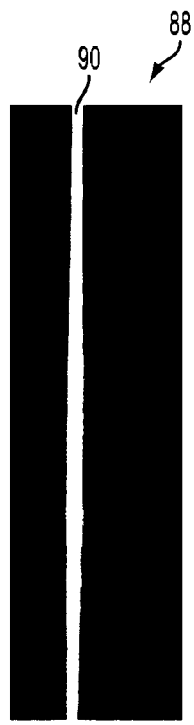
FIG. 9 illustrates an image of a light stripe projected onto a roadway surface by fan beam of light generated by an associated light projection system of a vehicular path sensing system, the image captured by one of two associated stereo cameras, for down-range distances from 5 meters to 17 meters from the vehicle.
Figure 10A:
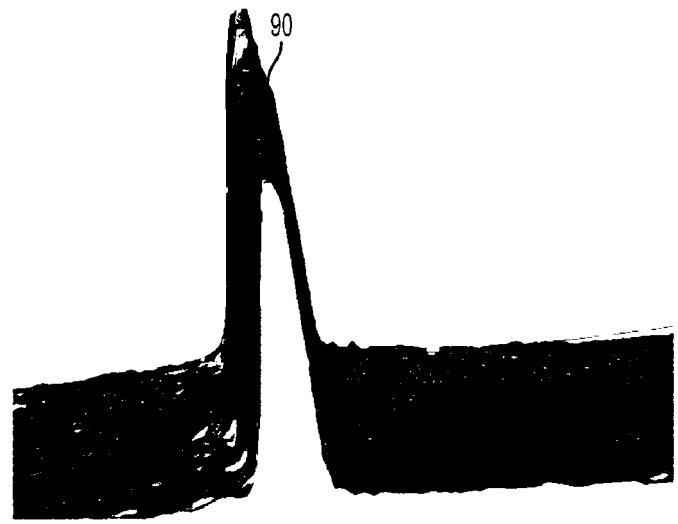
FIGS. 10a and 10b illustrate first and second isometric views of an intensity profile of the light stripe illustrated in FIG. 9.
Figure 10B:
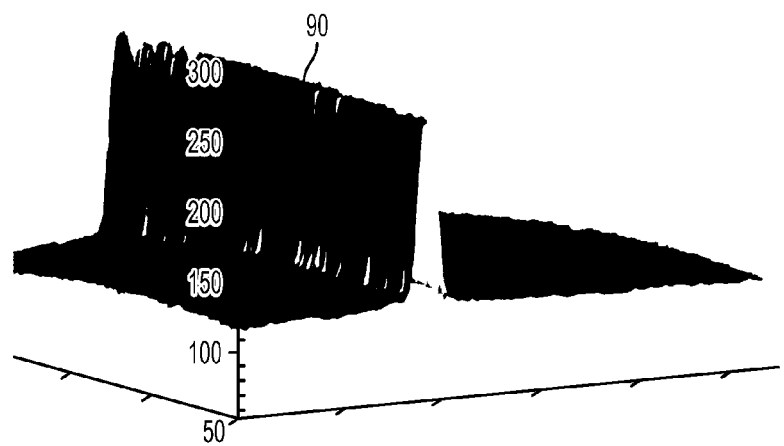

Referring again to FIG. 5, a fourth 76.4 and fifth 76.5 loci of points in image space 68 respectively correspond to respective values in real space 72 at values of cross-range coordinate $X_{Image}$ of $X_{Image}=-100$ cm and $X_{Image}=+100$ cm, each for values of down-range coordinate $Z_{World}$ every 100 cm from 500 cm to 3000 cm, illustrating image points 66 corresponding to real-world points 70 along the first 16.1 and second 16.2 fan beams of light on a flat roadway surface 48'. Accordingly, as illustrated in FIG. 5, the images 88.1, 88.2 of the corresponding resulting light stripes 90.1, 90.2 projected from the first 16.1 and second 16.2 fan beams of light on the flat roadway surface 48' exhibit substantially verticality therein, and are relatively narrow, with the associated column width in image space 68 increasing with increasing down-range coordinate $Z_{World}$, for example, spanning a column width of 10 pixels for image points 66 corresponding to a down-range coordinate $Z_{World}$ of 5 meters, and spanning a column width of 20 pixels for image points 66 corresponding to a down-range coordinate $Z_{World}$ of 20 meters. For example, FIG. 9 illustrates a portion of an image 88 of a light stripe 90 for a corresponding portion of a path 14 in real space 72 ranging from 5 meters to 17 meters down range from the vehicle 12, and FIGS. 10a and 10b illustrate different isometric views of an associated intensity profile. The relative narrowness and substantial verticality of the corresponding images 88.1, 88.2 of the light stripes 90.1, 90.2 provides for using the stereo vision image processor 26 to automatically generate a range map image 28 of the light stripes 90.1, 90.2 responsive to the associated corresponding first 88' and second 88" images from the first 20.1 and second 20.2 cameras, respectively.

More particularly, the first camera 20.1 generates a first image 88' of both light stripes 90.1, 90.2 from a first point of view, and the second camera 20.2 generates a second image 88" of both light stripes 90.1, 90.2 from a second point of view, wherein the first and second points of view are separated by the above-described baseline distance b. Each of the first 88' and second 88" images have the same total number of pixels organized into the same number of rows and columns, so that there is a one-to-one correspondence between pixels in the first image 88' and pixels of like row and column locations in the corresponding second image 88", and a similar one-toone correspondence between pixels in either the first 88' or second 88" images pixels of like row and column locations in the corresponding range map image 28, wherein the each pixel value of the first 88' or second 88" images correspond to an intensity value at the given row and column location, whereas the pixel values of the corresponding range map image 28 represent corresponding down-range coordinate $Z_{World}$ of that same row and column location.

For a given real-world point 70, the relative locations of corresponding first 66' and second 66" image points thereof in the first 88' and second 88" images are displaced from one another in their respective first 88' and second 88" images by an amount—referred to as disparity—that is inversely proportional to the down-range coordinate $Z_{World}$ of the real-world point 70. For each first image point 66' in the first image 88', the stereo vision image processor 26 locates—if possible—the corresponding second image point 66" in the second image 88" and determines the down-range coordinate $Z_{World}$ of the corresponding associated real-world point 70 from the disparity between the first 66' and second 66" image points. This process is simplified by aligning the first 20.1 and second 20.2 cameras so that for each first image point 66' along a given row coordinate $J_{ROW}$ in the first image 88', the corresponding associated epipolar curve in the second image 88" is a line along the same row coordinate $J_{ROW}$ in the second image 88", and for each second image point 66" along a given row coordinate $J_{ROW}$ in the second image 88", the corresponding associated epipolar curve in the first image 88' is a line along the same row coordinate $J_{ROW}$ in the first image 88', so that corresponding first 66' and second 66" image points associated with a given real-world point 70 each have the same row coordinate $J_{ROW}$ so that the corresponding first 66' and second 66" image points can be found from a one-dimensional search along a given row coordinate $J_{ROW}$. An epipolar curve in the second image 88" is the image of a virtual ray extending between the first image point 66' and the corresponding associated real-world point 70, for example, as described further by K. Konolige in "Small Vision Systems: Hardware and Implementation," *Proc. Eighth Int'l Symp. Robotics Research*, pp. 203-212, October 1997, (hereinafter "KONOLIGE"), which is incorporated by reference herein. The epipolar curve for a pinhole camera will be a straight line. The first 20.1 and second 20.2 cameras are oriented so that the focal planes 92.1, 92.2 of the associated lenses 20.1', 20.2' are substantially coplanar, and may require calibration as described by KONOLIGE or in Application '059, for example, so as to remove associated lens distortions and alignment offsets, so as to provide for horizontal epipolar lines that are aligned with the row coordinates $J_{ROW}$ of the first 20.1 and second 20.2 cameras.

Accordingly, with the epipolar lines aligned with common horizontal scan lines, i.e. common row coordinates $J_{ROW}$, of the first 20.1 and second 20.2 cameras, the associated disparities DX or corresponding first 66' and second 66" image points corresponding to a given associated real-world point 70 will be exclusively in the X, i.e. horizontal, direction, so that the process of determining the down-range coordinate $Z_{World}$ of each real-world point 70 implemented by the stereo vision image processor 26 then comprises using a known algorithm—for example, either what is known as the CENSUS algorithm, or an area correlation algorithm—to find a correspondence between first 66' and second 66" image points, each having the same row coordinates $J_{ROW}$ but different column coordinate $I_{COL}$ in their respective first 88' and second 88" images, the associated disparity DX either given by or responsive to the difference in corresponding column coordinates $I_{COL}$. As one example, the CENSUS algorithm is described by R. Zabih and J. Woodfill in "Non-parametric Local Transforms for Computing Visual Correspondence," *Proceedings of the Third European Conference on Computer Vision*, Stockholm, May 1994; by J Woodfill and B, Von Herzen in "Real-time stereo vision on the PARTS reconfigurable computer," in *Proceedings The 5th Annual IEEE Symposium on Field Programmable Custom Computing Machines*, (April, 1997); by J. H. Kim, C. O. Park and J. D. Cho in "Hardware implementation for Real-time Census 3D disparity map Using dynamic search range," from Sungkyunkwan University School of Information and Communication, Suwon, Korea; and by Y. K. Baik, J. H. Jo and K. M. Lee in "Fast Census Transform-based Stereo Algorithm using SSE2," in The 12th Korea-Japan Joint Workshop on Frontiers of Computer Vision, 2-3, Feb., 2006, Tokushima, Japan, pp. 305-309, all of which are incorporated herein by reference. As another example, the area correlation algorithm is described by KONOLIGE, also incorporated herein by reference. As yet another example, the disparity associated with each pixel in the range map image 28 may be found by minimizing either a Normalized Cross-Correlation (NCC) objective function, a Sum of Squared Differences (SSD) objective function, or a Sum of Absolute Differences (SAD) objective function, each objective function being with respect to Disparity DX, for example, as described in the following internet document: http:[slash][slash]3dstereophoto.b-logspot.com[slash]2012[slash]01[slash]stereo-matching-local-methods.html, which is incorporated herein by reference, wherein along a given row coordinate $J_{ROW}$ of the first 88' and second 88" images, for each column coordinate $I_{COL}$ in the first image 88', the NCC, SSD or SAD objective functions are calculated for a first subset of pixels $I_1(u,v)$ centered about the pixel $I_1(I_{COL}, J_{ROW})$, and a second subset of pixels $I_2(u,v)$ centered about the pixel $I_1(I_{COL}+DX, J_{ROW})$, as follows:

$$NCC(DX(I_{COL}, J_{ROW})) = \frac{\sum_{u,v} [I_1(u, v) - \bar{I}_1] \cdot [I_2(u + DX(I_{COL}, J_{ROW}), v) - \bar{I}_2]}{\sqrt{\sum_{u,v} [I_1(u, v) - \bar{I}_1]^2} \cdot \sqrt{\sum_{u,v} [I_2(u + DX(I_{COL}, J_{ROW}), v) - \bar{I}_2]^2}} \quad (10)$$

$$SSD(DX(I_{COL}, J_{ROW})) = \sum_{u,v} [I_1(u, v) - I_2(u + DX(I_{COL}, J_{ROW}), v)]^2 \quad (11)$$

$$SAD(DX(I_{COL}, J_{ROW})) = \sum_{u,v} |I_1(u, v) - I_2(u + DX(I_{COL}, J_{ROW}), v)| \quad (12)$$

wherein $$\sum_{u,v} = \sum_{u=I_{COL}-p}^{I_{COL}+p} \sum_{v=J_{ROW}-q}^{J_{ROW}+q},$$

and the resulting Disparity DX is the value that minimizes the associated objective function (NCC, SSD or SAD). For example, in one embodiment, p=q=2.

Regardless of the method employed, the stereo vision image processor 26 generates the range map image 28 from the first 88' and second 88" images, each comprising an $N_{ROW} \times N_{COL}$ array of image intensity values, wherein the range map image 28 comprises an $N_{ROW} \times N_{COL}$ array of corresponding down-range coordinate $Z_{World}$ values, i.e.:

$$Z_{World}(I_{COL}, J_{ROW}) = \frac{C_Z}{|DX(I_{COL}, J_{ROW})|} \quad (13)$$

wherein each column $I_{COL}$ and row $J_{ROW}$ coordinate in the range map image 28 is referenced to, i.e. corresponds to, a corresponding column $I_{COL}$ and row $J_{ROW}$ coordinate of one of the first 88' and second 88" images, for example, of the first image 88', and $C_Z$ is calibration parameter determined during an associated calibration process.

The elevation $Y_{World}$ of a real-world point 70 of the path 14, 14.1, 14.2, or an object thereupon, is determined in real space 72 coordinates by transforming the sensed column $I_{COL}$ and row $J_{ROW}$ coordinates of each image point 66 thereof to corresponding cross-range $X_{World}$, down-range $Z_{World}$, and elevation $Y_{World}$ coordinates in real space 72 using equations (5)-(9).

Figure 11:
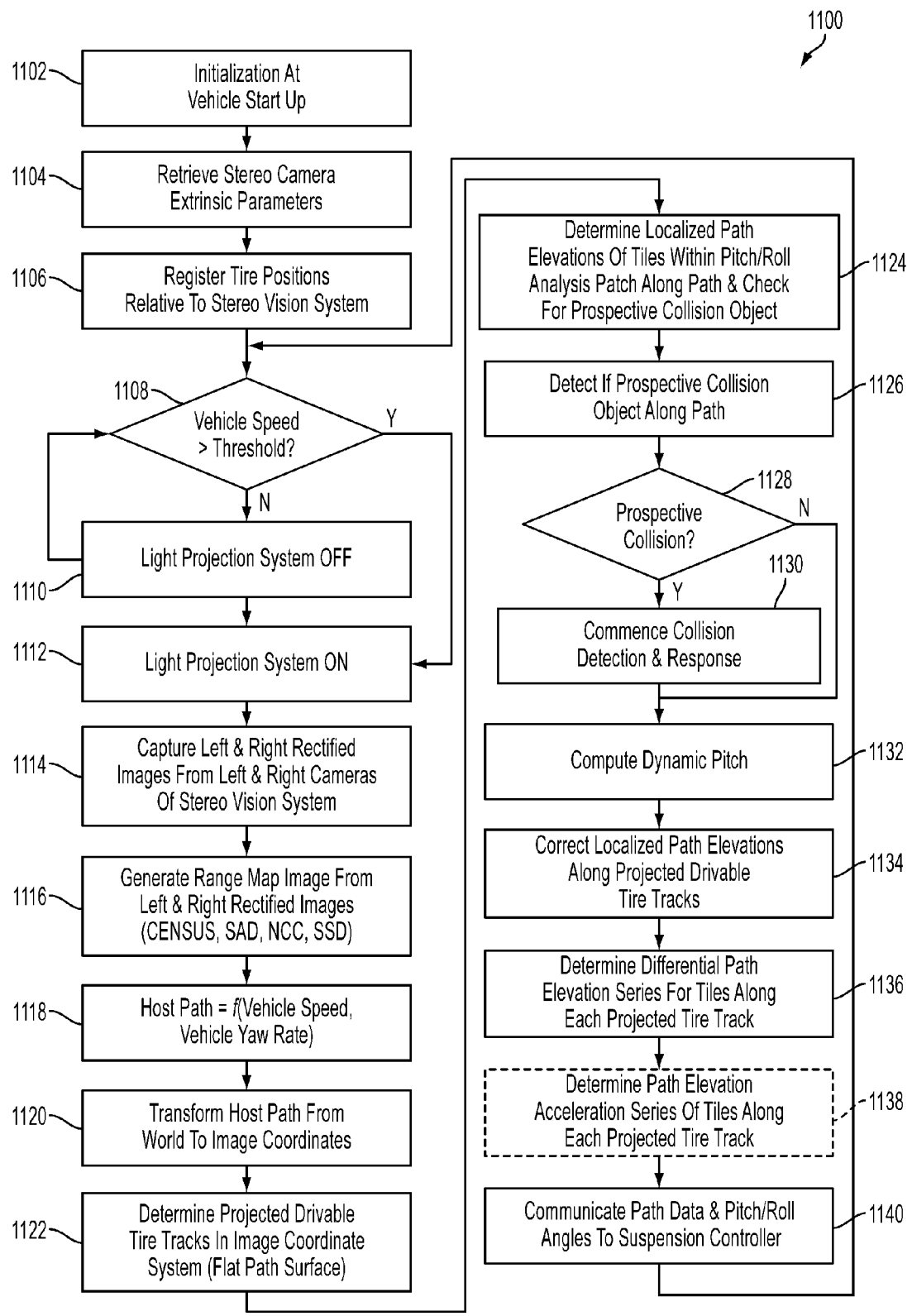
FIG. 11 illustrates a flow chart of road surface preview process of a vehicular path sensing system.

More particularly, referring to FIG. 11, an associated road surface preview process 1100 commences with an initialization in step (1102) when the vehicle 12 is started, which includes the computation of various look-up tables,—for example, containing associated camera calibration parameters used for stereo matching,—that are stored in embedded DDR memory 34. Then, in step (1104), various extrinsic parameters associated with the stereo vision system 22 are retrieved, for example, the associated mounting height $h_c$, static camera pitch angle $\phi^{Static}$, and lateral offsets from the longitudinal axis 74 of the vehicle 12, of the first 20.1 and second 20.2 cameras. Then, in step (1106), the lateral positions of the tires 94 of the vehicle 12 are registered in the associated image space 68 of the stereo vision system 22. Then, in step (1108), if the speed of the vehicle 12 does not exceed a threshold, then, in step (1110), the associated light projection system 18, 18.1, 18.2 is turned OFF, so as to prevent a viewing of the associated fan beams of light 16, 16.1, 16.2 by people or animals, which could otherwise be potentially injurious if viewed for a sufficiently long period of time as might be possible under static or quasi-static conditions.

Otherwise, from step (1108), if the speed of the vehicle 12 does not exceed a threshold, then, in step (1112), the associated light projection system 18, 18.1, 18.2 is turned ON so as to project associated first 16.1 and second 16.2 fan beams of light onto the roadway surface 48' along the path 14 of the vehicle 12, and, in step (1114), the first 88' and second 88" images, i.e. left 88' and right 88" images, are respectively captured by respective first 20.1 and second 20.2 cameras of the stereo vision system 22, wherein the first 88' and second 88" images are rectified so that the associated epipolar lines of each left 88' and right 88" image are aligned with corresponding rows of pixels therein, as described more fully hereinabove. Then, in step (1116), the range map image 28 is generated from the rectified first 88' and second 88" image, for example, using equation (13) responsive to associated disparities DX determined using either either a Census, area correlation, NCC, SSD or SAD algorithm, as described more fully hereinabove.

Then, in step (1118), the projected trajectory of the vehicle 12 is determined using a clothoid model as a function of the speed V and yaw rate ω of the vehicle 12, as will be described more fully hereinbelow for a curved path. However, for the special case of the vehicle 12 traveling along a substantially straight-line path, the tracks of the front and rear tires will be located along a range of down-range coordinates $Z_{World}$ in real space 72 at cross-range coordinate $X_{World}$ values of $+/-W_F/2$ and $+/-W_R/2$ for the front 94.1 and rear 94.2 tires, respectively, wherein $W_F$ and $W_R$ are the respective track separations between the front 94.1 and rear 94.2 tires, respectively.

Then, in step (1120), the projected trajectory of the vehicle 12 is transformed from real space 72 to image space 68, i.e. from world to image coordinates, and in step (1122), the projected drivable tire tracks 96', 96" are determined in image space 68, assuming a flat roadway surface 48'. For example, in accordance with one set of embodiments, in step (1120), the projected trajectory of the centerline of the vehicle 12 is transformed from real space 72 to image space 68, and then in step (1122), the projected drivable tire tracks 96', 96" are determined therefrom in image space 68, for example, by accounting for the separation of the tire tracks 96', 96" in image space 68.

In accordance with another set of embodiments, steps (1120) and (1122) are replaced by a single composite step wherein the projected drivable tire tracks 96', 96" are first determined in real space 72 and then transformed to image space 68 assuming a flat roadway surface 48'. For example, in the case of a vehicle 12 driving along a straight-line path, the projected drivable tire tracks 96', 96" of the left 94' and right 94" tires may be readily first determined directly in real space 72, followed by transformation of each tire track 96', 96" from real space 72 to image space 68.

Accordingly, for a projected location of the front tires 94.1 at a down-range coordinate value of $Z_{World}$, the location of the corresponding image points 66 of the left 94.1' and right 94.1" front tires on a flat roadway surface 48' are respectively given from equations (1)-(4) as follows:

For the left front tire 94.1':

$$X_{Image}^{F'} = -\frac{f_X \cdot \frac{W_F}{2}}{Z_{World} \cdot \cos(\varphi) + h_C \cdot \sin(\varphi)}, \text{ and} \quad (1.1)$$

$$I_{COL}^{F'} = X_{Image}^{F'} + \frac{N_{COLS}}{2} + .5; \quad (2.1)$$

For the right front tire 94.1":

$$X_{Image}^{F''} = +\frac{f_X \cdot \frac{W_F}{2}}{Z_{World} \cdot \cos(\varphi) + h_C \cdot \sin(\varphi)}, \text{ and} \quad (1.2)$$

$$I_{COL}^{F''} = X_{Image}^{F''} + \frac{N_{COLS}}{2} + .5; \quad (2.2)$$

For both the left 94.1' and right 94.1" front tires:

$$Y_{Image}^F = -\frac{f_Y \cdot (Z_{World} \cdot \sin(\varphi) - h_C \cdot \cos(\varphi))}{Z_{World} \cdot \cos(\varphi) + h_C \cdot \sin(\varphi)}, \text{ and} \quad (3.1)$$

$$J_{ROW}^F = -Y_{Image}^F + \frac{N_{ROWS}}{2} + .5, \quad (4.1)$$

With the projected location of the front tires 94.1 at a down-range coordinate value of $Z_{World}$, and for a vehicle wheelbase L, the projected location of the rear tires 94.2 will be at a down-range coordinate $Z_{World}$–L, so that the location of the corresponding image points 66 of the left 94.2' and right 94.2" rear tires on a flat roadway surface 48' are respectively given from equations (1)-(4) as follows:

For the left rear tire 94.2':

$$X_{Image}^{R'} = -\frac{f_X \cdot \frac{W_R}{2}}{(Z_{World} - L) \cdot \cos(\varphi) + h_C \cdot \sin(\varphi)}, \text{ and} \quad (1.3)$$

$$I_{COL}^{R'} = X_{Image}^{R'} + \frac{N_{COLS}}{2} + .5; \quad (2.3)$$

For the right rear tire 94.2":

$$X_{Image}^{R''} = +\frac{f_X \cdot \frac{W_R}{2}}{(Z_{World} - L) \cdot \cos(\varphi) + h_C \cdot \sin(\varphi)}, \text{ and} \quad (1.4)$$

$$I_{COL}^{R''} = X_{Image}^{R''} + \frac{N_{COLS}}{2} + .5; \quad (2.4)$$

For both the left 94.2' and right 94.2" rear tires:

$$Y_{Image}^R = \frac{f_Y \cdot ((Z_{World} - L) \cdot \sin(\varphi) - h_c \cdot \cos(\varphi))}{(Z_{World} - L) \cdot \cos(\varphi) + h_c \cdot \sin(\varphi)}, \text{ and} \quad (3.2)$$

$$J_{ROW}^R = -Y_{Image}^R + \frac{N_{ROWS}}{2} + .5. \quad (4.2)$$

Each of the first 88' and second 88" images and the range map image 28 comprise a plural of pixels in image space 68, each of which maps to a corresponding region in real space 72 that is substantially smaller area than the associated contact area of each of the tires 94.1', 94.1", 94.2', 94.2" of the vehicle 12. Although the real space 72 could be pixelated to the same resolution as the corresponding image space 68, the resolution in real space 72 may be reduced by combining groups of pixels in image space 68 into corresponding tiles 98 in real space 72, wherein the relatively fewer number of tiles 98 provides for simplification of subsequent processing steps and an inherent reduction or filtering of associated measurement noise.

Figure 12:
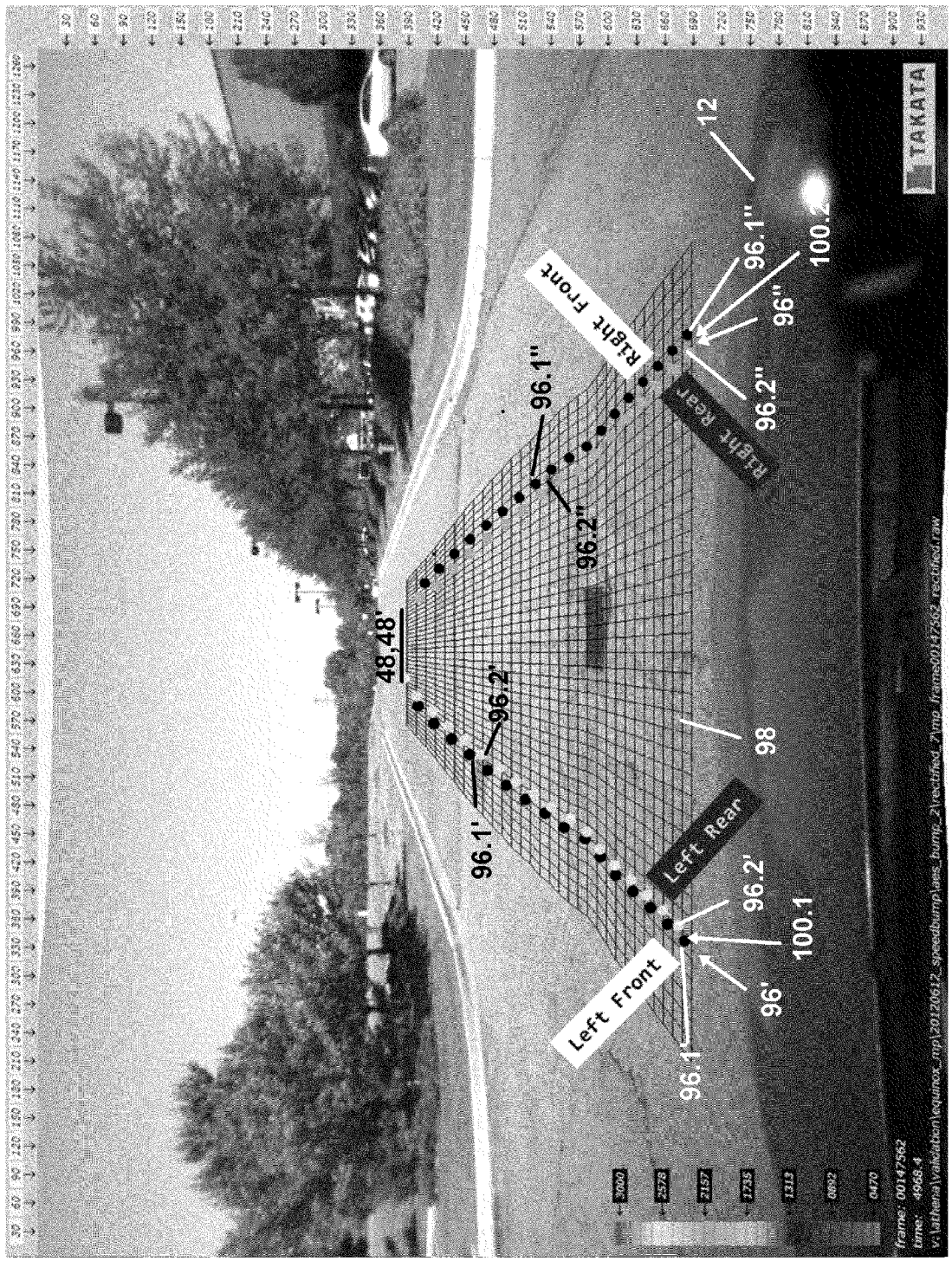
FIG. 12 illustrates a set of projected tire tracks generated by an associated vehicular path sensing system, for each of four tires of a vehicle, overlaid upon an image of an associated visual scene from one of two stereo cameras of the vehicular path sensing system.

For example, in one set of embodiments, given the locations of the tire tracks 96', 96" in image space 68, the individual pixels of the range map image 28 are transformed into corresponding tiles 98 of elevation coordinate $Y_{World}$ data in real space 72 within a continuous region of image space 68 which includes the corresponding tire tracks 96', 96" and which laterally extends therebeyond by a sufficient amount so as to include portions of the roadway surface 48' upon which the tires 94.1', 94.1", 94.2', 94.2" could likely roll. For example, referring to FIG. 12, there is illustrated a plurality of points in image space 68 corresponding to the left front tire track 96', 96.1', the right front tire track 96", 96.1", the left rear tire track 96', 96.2', and the right rear tire track 96", 96.2", and an array of a plurality of associated tiles 98 over a region that laterally spans the left 96' and right 96" tire tracks in cross-range, and that longitudinally extends from the closest visible region of the roadway surface 48' (i.e. just beyond the hood of the vehicle 12) at least to a projected region of the roadway surface 48' that is projected to become this closest visible region within a given period of time at the current velocity $V_z$ of the vehicle 12, for example, within 15 to 20 milliseconds. For example, in one embodiment, the tiles 98 are generally rectangular in shape in real space 72, about half the width of the tires 94, or about 10 centimeters wide in cross-range, and about 20 centimeters deep in down-range, for example, about one-eighth of the nominal rolling circumference of the tire 94.

The first 16.1 and second 16.2 fan beams of light are substantially aligned with the corresponding left 96' and right 96" tire tracks—at least either for relatively near-range locations relative to the vehicle 12 or for the vehicle 12 traveling along a straight-line trajectory—and in one set of embodiments, the tiles 98 are located in alignment with the left 96' and right 96" tire tracks, at least at relatively near-range locations relative to the vehicle 12. For example, in one set of embodiments, for the vehicle 12 traveling along a straight-line trajectory, a first set of longitudinally-extending lateral tile boundaries 100.1 is located along the left tire track 96', and a second set of longitudinally-extending lateral tile boundaries 100.2 is located along the right tire track 96", with the associated tiles 98 being about half the width of the tires 94, so that the left tire track 96' would then span two columns of tiles 98 spanning the first set of longitudinally-extending lateral tile boundaries 100.1, and the right tire track 96" would then span two columns of tiles 98 spanning the second set of longitudinally-extending lateral tile boundaries 100.2. Accordingly, with the first 16.1 and second 16.2 fan beams of light substantially aligned with the corresponding left 96' and right 96" tire tracks, the associated tiles 98 will be illuminated thereby so that the corresponding associated pixels of the range map image 28 will become populated with corresponding down-range coordinate $Z_{World}$ measurements.

The pixels of the range map image 28 corresponding to the remaining tiles 98 that are not illuminated by the fan beams of light 16, 16.1, 16.2—which provide information useful for collision avoidance, as described more fully hereinbelow—may or may not become populated with corresponding down-range coordinate $Z_{World}$ measurements, depending upon the corresponding visibility of associated visual textural features sufficient to provide for stereo processing thereof by the stereo vision image processor 26. For example, stereo viewing might not be possible either at night or if the roadway surface 48' is covered by rain or snow. Alternatively, the vehicular path sensing system 10 might be provided with either one or more additional fan beams of light 16—either fixed or azimuthally-scanned,—or by azimuthally scanning the first 16.1 or second 16.2 fan beams of light, so as to provide for illuminating portions of the roadway surface 48' between the left 96' and right 96" tire tracks.

Accordingly, beginning with a down-range coordinate $Z_{World}$ corresponding to nearest visible portion of the roadway surface 48', for example, about 500 centimeters, the locations of the first 100.1 and second 100.2 sets of longitudinally-extending lateral tile boundaries are located in image space 68 using the corresponding projected column locations of the left 96' and right 96" tire tracks from equations (2.1) and (2.2), and the associated corresponding row location from equation (4.1). Then the remaining corresponding boundaries of the tiles 98 are defined in image space 68 so as to provide for associating each tile 98 with a corresponding set of pixels of the range map image 28. Then, for each tile 98, the elevation coordinate $Y_{World}$ of each associated pixel, or of a subset of associated pixels, is determined as follows, using the corresponding down-range coordinate $Z_{World}(I_{COL}, J_{ROW})$ from the range map image 28:

$$Y_{Image}(J_{ROW}) = \frac{N_{ROWS}}{2} + .5 - J_{ROW}; \text{ and} \quad (9.1)$$

$$Y_{World}(I_{COL}, J_{ROW}) = h_C - \frac{Z_{World}(I_{COL}, J_{ROW}) \cdot (f_Y \cdot \sin(\varphi) - Y_{Image}(J_{ROW}) \cdot \cos(\varphi))}{f_Y \cdot \cos(\varphi) + Y_{Image}(J_{ROW}) \cdot \sin(\varphi)}. \quad (7.1)$$

The corresponding elevation coordinate $Y_{World}$ of the associated tile 98 is then given as either the median or average of the elevation coordinates $Y_{World}$ of the set of pixels associated with that tile 98.

Figure 13:
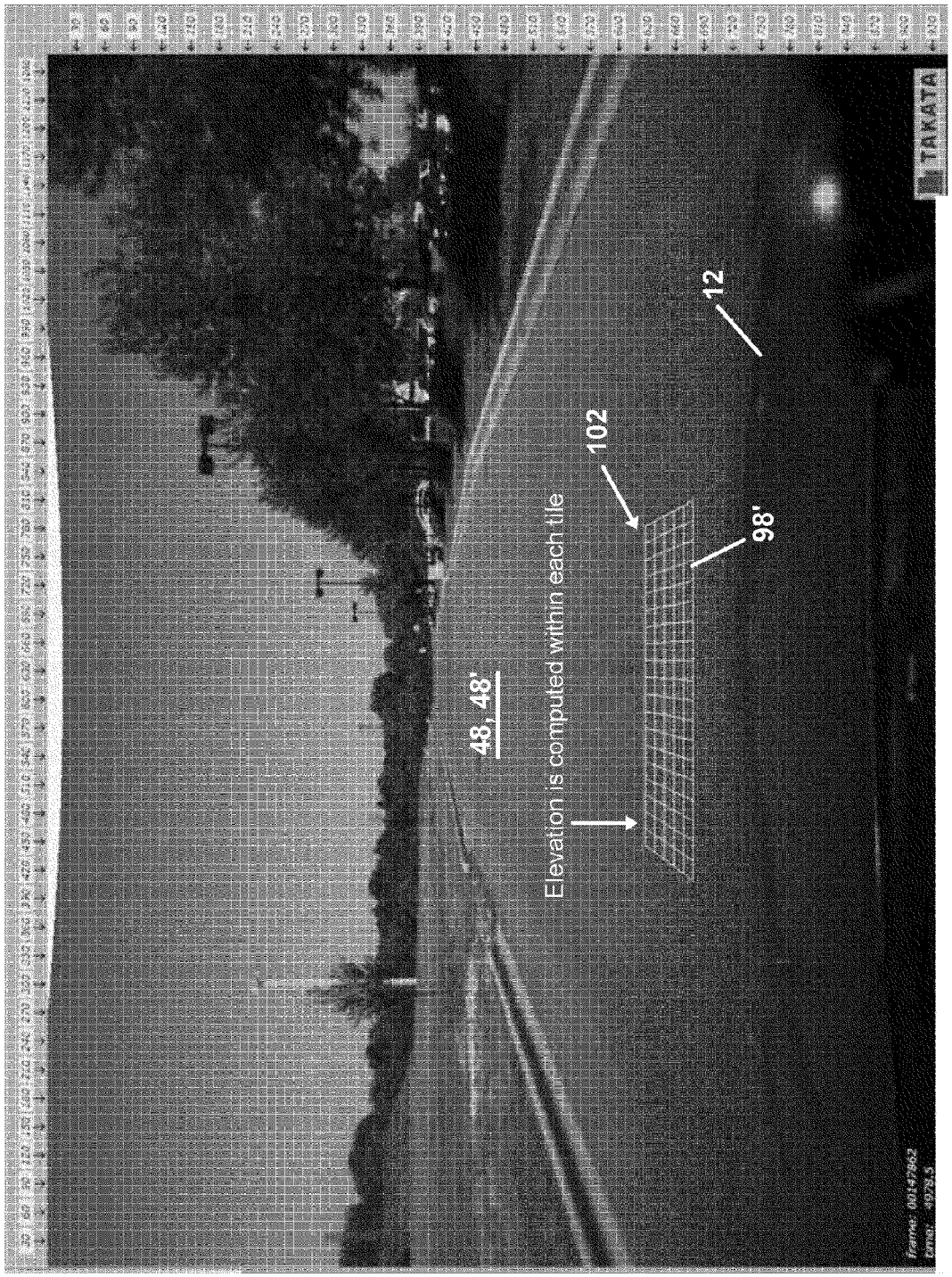
FIG. 13 illustrates a subset of tiles spanning a contiguous region of down-range and cross-range distances used for determining vehicle attitude, overlaid upon an image of an associated visual scene from one of two stereo cameras of a vehicular path sensing system.

Referring to FIG. 13, a relatively near-range subset 102 of tiles 98, referred to herein as a pitch/roll analysis patch 102, laterally centered with respect to the left 96' and right 96" tire tracks, provides for determining, in step (1124), the pitch and roll of the vehicle from an analysis of the elevation coordinates $Y_{World}$ of the associated tiles 98, as described more fully hereinbelow. Also in step (1124), first the tiles 98 in the pitch/roll analysis patch 102, and then the remaining tiles 98, are analyzed to determine whether or not a prospective collision object is within the path 14 of the vehicle 12. For example, if the elevation coordinate $Y_{World}$ of any tiles 98 between the left 96' and right 96" tire tracks exceeds a first threshold corresponding to the undercarriage clearance of the vehicle 12, or if any tiles 98 along the left 96' and right 96" tire tracks either exceeds a second threshold, or is less than a third threshold—wherein the second threshold corresponds to the maximum tolerable elevation coordinate $Y_{World}$ of an object or disturbance above the roadway surface 48' over which the tires 94 of the vehicle 12 might travel, and the third threshold corresponds to the lowest tolerable depth of a dip or pothole in the roadway surface 48' over which the tires 94 of the vehicle 12 might travel—then, in step (1126), the prospective collision object is detected from either the first 88' or second 88" images, from the range map image 28, or a combination thereof, for example, in accordance with the teachings of U.S. patent application Ser. No. 11/658,758 filed on 19 Feb. 2008, entitled *Vulnerable Road User Protection System;* or U.S. patent application Ser. No. 13/286,656 filed on 1 Nov. 2011, entitled *Method of Identifying an Object in a Visual Scene;* U.S. Provisional Application No. 61/584,354 filed on 9 Jan. 2012, entitled *Stereo-Vision Object Detection System And Method,* or U.S. application Ser. No. 13/465,059 (hereinafter, "Application '059"), filed on 7 May 2012, entitled *Range-cued Object Segmentation System and Method;* or all of which are incorporated herein by reference. Furthermore, measurements of elevation coordinates $Y_{World}$ at locations outside the bounds of the left 96' and right 96" tire tracks, while not used for electronic suspension controls may also be tracked to detect features adjacent to the drivable roadway surface 48', for example, associated curbs, barriers, poles, or fall-offs from the roadway surface 48'. If, in step (1128) a prospective collision object is detected in step (1126), then, in step (1130), a collision detection process is commence followed by an appropriate response, for example, as described in the above-identified patent applications incorporated by reference herein. Then, either from step (1130), or otherwise from step (1128), in step (1132) the pitch angle θ of the vehicle 12—relative to horizontal—is computed from an analysis of the elevation coordinates $Y_{World}$ of the tiles 98 of the pitch/roll analysis patch 102, as is described more fully hereinbelow. Then, in step (1134), the elevation coordinates $Y_{World}$ of the tiles 98 along the left 96' and right 96" tire tracks are corrected by recalculating the associated elevation coordinates $Y_{World}$ of the associated pixels with equation (7.1), but for a camera pitch angle φ given by:

$$\varphi = \varphi^{Static} + \theta, \quad (14)$$

and then recalculating the elevation coordinates $Y_{World}$ of the associated tiles 98 along the left 96' and right 96" tire tracks, as described hereinabove.

Figure 14:
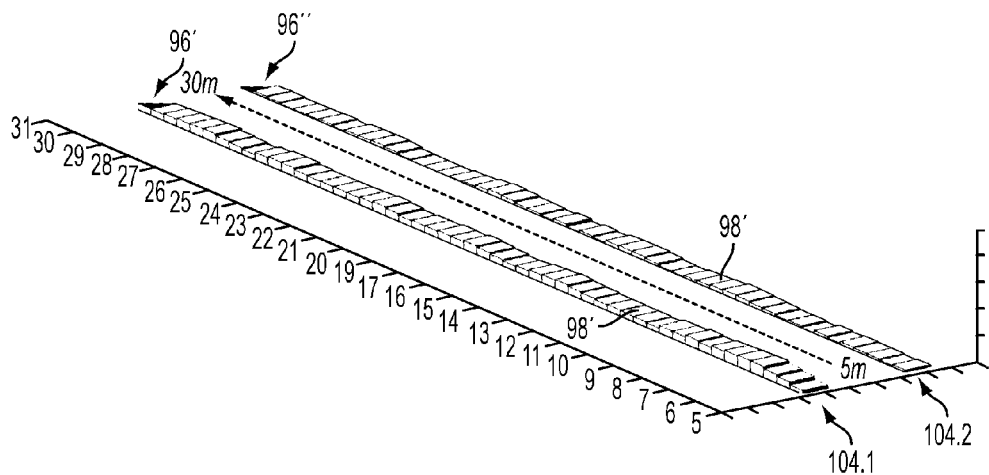
FIG. 14 illustrates an oblique view of portions of the profile of a road surface along the associated projected corresponding trajectories of the left and right tire vehicular tire tracks.
Figure 15:
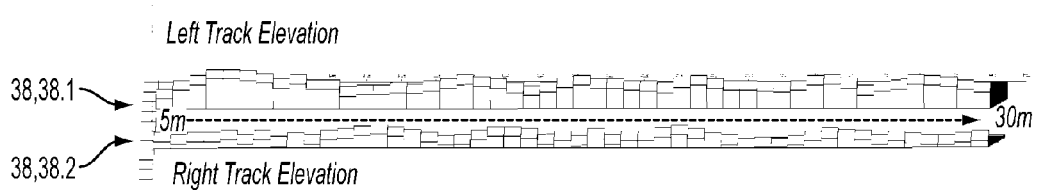
FIG. 15 illustrates the elevation profiles of the left and right tire tracks illustrated in FIG. 14.
Figure 16:
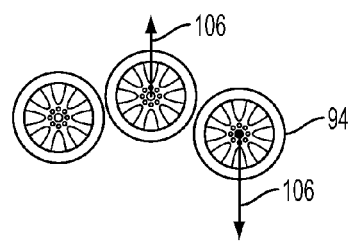
FIG. 16 illustrates a model of tire motion along a corresponding tire track.
Figure 17:
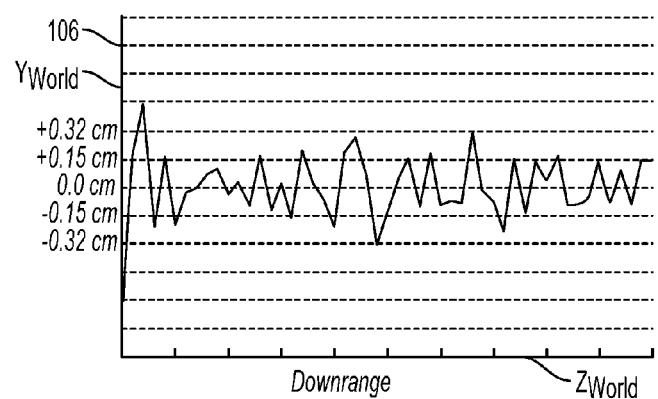
FIG. 17 illustrates a plot of tire displacement as a function of path distance for one of the tire tracks illustrated in FIG. 15.

For example, referring to FIGS. 14 and 15, there is illustrated first 104.1 and second 104.2 subsets of tiles 98' along the respective corresponding left 96' and right 96" tire tracks of the vehicle 12, each tile 98' being 50 centimeters deep in down-range and 50 centimeters wide in cross-range, for example, either calculated directly from the associated pixels as described hereinabove, or calculated as a composite of the above-described relatively-smaller tiles 98, for example, by averaging groups of relatively-smaller tiles 98. For example, in another embodiment, each tile 98' of the first 104.1 and second 104.2 subsets of tiles 98' is the same 20 centimeter down-range depth as the individual pixel-derived tiles 98, but is formed from an average of the two 10 centimeter wide pixel-derived tiles 98 that are adjacent in cross-range to one another and together either abutting or closest to the particular left 96' and right 96" tire track at a given associated down-range location therealong. Accordingly, the first 104.1 and second 104.2 subsets of tiles 98' provide for determining corresponding elevation profiles 38, 38.1, 38.2 of the left 96' and right 96" tire tracks. For example, FIG. 14 illustrates an isometric view of the projected left 96' and right 96" tire tracks for a vehicle 12 driving along a straight path 14, wherein in FIG. 15, the left 96' and right 96" tire tracks are stacked adjacent to one another to better illustrate the associated elevation profiles 38, 38.1, 38.2, which can be used to predict the motion and dynamics of the suspension system of the vehicle 12 when the tires 94 of the vehicle are driven over the left 96' and right 96" tire tracks, for example, as illustrated in FIGS. 16 and 17, respectively illustrating a tire in motion over time and a corresponding plot of associated wheel displacement 106 as a function of down-range travel distance Z of the vehicle 12.

Referring again to FIG. 11, following step (1134), in step (1136), a differential elevation profile $\Delta Y_{World}$, is determined from the associated elevation coordinates elevation coordinates $Y_{World}$ of each corresponding elevation profile 38, 38.1, 38.2 as follows, wherein the index k—increasing away from the vehicle 12—refers to the particular tiles 98' of the associated first 104.1 and second 104.2 subsets of tiles 98' associated with the corresponding left 96' and right 96" tire tracks, and the index m refers to the particular associated left 96' or right 96" tire track, or left front tire track 96', 96.1', right front tire track 96", 96.1", left rear tire track 96', 96.2' or right rear tire track 96", 96.2", $$\Delta Y_{World}{}^m(k) = Y_{World}{}^m(k+1) - Y_{World}{}^m(k) \quad (15)$$

for k=1 to $N_{TILES}-1$, wherein $N_{TILES}$ is the number of tiles 98' in each of the first 104.1 and second 104.2 subsets of tiles 98'. The differential elevation profile $\Delta Y_{World}$ is relatively invariant with respect to the pitch angle θ of the vehicle 12, and can be used to control an associated suspension system of the vehicle 12, for example, so as to provide for controlling the associated ride and handling thereof, for example, an associated variable-damping electronic suspension control system 42' as illustrated in FIG. 2 that provides for separately controlling the damping rate of associated controllable suspension dampers of the vehicle, for example, magneto-rheologically controlled suspension dampers. For example, in FIG. 2 illustrates one of two front-quarter suspension systems 108 and one of two rear-quarter suspension systems 110, each incorporating a tire/wheel assembly 112, a suspension spring 114 and a controllable damper 38.

Following step (1136), in step (1138), the vertical acceleration $a_y$ of the roadway surface 48' along the left 96' and right 96" tire tracks may be calculated as another measure that may be used for electronic suspension control, either as an alternative to or in addition to the differential elevation profile $\Delta Y_{World}$, for example, as given by:

$$a_y = V_z^2 \cdot \frac{d^2 Y_{World}}{dZ_{World}^2} + \frac{dY_{World}}{dZ_{World}} \cdot a_z \tag{16}$$

wherein $V_z$ and $a_z$ are the longitudinal velocity and acceleration of the vehicle 12, respectively. Equation (16) can be approximated by:

$$a_y(k) = V_z(k)^2 \cdot \frac{\Delta Y_{World}(k+1) - \Delta Y_{World}(k)}{Z_{World}(k+1) - Z_{World}(k)} + \frac{\Delta Y_{World}(k)}{Z_{World}(k+1) - Z_{World}(k)} \cdot a_z(k) \tag{17}$$

which, for constant longitudinal velocity $V_z$, simplifies to:

$$a_y(k) = V_z^2 \cdot \frac{\Delta Y_{World}(k+1) - \Delta Y_{World}(k)}{Z_{World}(k+1) - Z_{World}(k)}. \tag{17.1}$$

wherein $Z_{World}(k)$ is the down-range coordinate of the $k^{th}$ tile 98', e.g. of the center thereof.

Following step (1138), in step (1140), the measured path data, i.e. the differential elevation profile $\Delta Y_{World}$ series and an associated series of corresponding down-range coordinates $Z_{World}$—each series containing corresponding values of each corresponding tile 98' for each of the left 96' and right 96" tire tracks,—and, if calculated, the corresponding vertical acceleration $a_y$ series, is/are communicated to the suspension controller 40, together with the estimated vehicle pitch angle θ and, if available, the estimate vehicle roll angle β, as determined in step (1132), so as to provide for controlling the associated electronic suspension control system 42 responsive to the anticipated elevation profiles 38, 38.1, 38.2 of the left 96' and right 96" tire tracks along the roadway surface 48' or path 14.

Furthermore, in one set of embodiments, in step (1140), either velocity V and/or acceleration $a_z$ of the vehicle 12, or a corresponding series of estimates of the time-to-encounter for each tile 98' in the differential elevation profile $\Delta Y_{World}$ series is also communicated to the suspension controller 40. Yet further, a quality measure may also be calculated and communicated to the suspension controller 40 that is representative of the quality of the differential elevation profile $\Delta Y_{World}$ series, i.e. representative of the trustworthiness of the associated measurements, which indicates how tightly the associated elevation $Y_{World}$ or differential elevation profile $\Delta Y_{World}$ measurements are clustered or correlated within each tile 98, 98' or region-of-interest. For example, in one embodiment, for a given tile 98, 98' or region-of-interest, the quality measure Q is calculated as:

$$Q = \frac{\sum_{i=1}^{N} |W_i - \text{median}(W)|}{N-1}. \tag{18}$$

wherein W is the quantity to which the quality measure Q applies, for example, elevation $Y_{World}$ or differential elevation profile, N is the number of elements of W within the particular tile 98, 98' or region-of-interest, and median(W) is the median value of the absolute deviation of W within the particular tile 98, 98' or region-of-interest (ROI). For example, the region-of-interest (ROI) may cover a collection of tiles 98, 98'.

At a given point in time, the plurality of real-world points 70 over a range of down-range coordinates $Z_{World}$ provide for a static measure of the associated elevation profile 38 of the path 14. As the vehicle 12 moves forward, to the extent that relatively closer real-world points 70 follow the same path 14 of relatively farther real-world points 70, then the same portions of the path 14 detected by a relatively farther real-world point 70 at a relatively earlier point in time will become detected by a relatively closer real-world point 70 at a relatively later point in time, with greater accuracy as described hereinbelow.

Referring to FIG. 18, in respect of steps (1118) through (1122) of the road surface preview process 1100 illustrated in FIG. 11, but for a curved roadway 48, a centerline 116 of a curved path 14\* is illustrated in real space 72, together with corresponding locations of the tires 94.1', 94.1", 94.2', 94.2" of an associated vehicle 12 at a future point in time traveling therealong, wherein the front tires 94.1', 94.1" are at a yaw angle α relative to the vehicle 12 at the current location 118, and the rear tires 94.2', 94.2" are at a corresponding yaw angle α−Δα. The curvature R of the centerline 116 of the curved path 14\* is estimated from measurements of vehicular longitudinal velocity V and yaw rate ω by:

$$R = \frac{V}{\omega} = \frac{1}{C_0} \tag{19}$$

which is assumed to be constant for this analysis. The curvature of the roadway 48 is generally estimated by a clothoid model, of which $C_0$ is the $0^{th}$ order parameter.

For a given prospective down-range coordinate $Z_{World}^F$ of the midpoint between the front tires 94.1', 94.1" at a future point in time along the centerline 116 of a curved path 14\*, the corresponding cross-range coordinate $X_{World}^F$ of that midpoint is estimated as:

$$X_{World}^F = -R \cdot \left(1 - \sqrt{1 - \left(\frac{Z_{World}^F}{R}\right)^2}\right) \approx -\frac{C_0 \cdot Z_{World}^{F2}}{2}, \tag{20}$$

wherein the corresponding prospective yaw angle α is given by:

$$\alpha = \sin^{-1}(C_0 \cdot Z_{World}) \tag{21}$$

The corresponding coordinates along the left front tire track 96', 96.1' and right front tire track 96", 96.1" can then be estimated as:

$$Track_{LF} = \left(X_{World}^F - \frac{W_F \cdot \cos(\alpha)}{2}, Z_{World}^F - \frac{W_F \cdot \sin(\alpha)}{2}\right) \quad (22)$$

$$Track_{RF} = \left(X_{World}^F + \frac{W_F \cdot \cos(\alpha)}{2}, Z_{World}^F + \frac{W_F \cdot \sin(\alpha)}{2}\right) \quad (23)$$

wherein $W_F$ is the track width between the front tires 94.1', 94.1".

For a vehicle wheelbase L, the corresponding locations of the down-range coordinate $Z_{World}^R$ of the midpoint between the rear tires 94.2', 94.2", and the corresponding associated cross-range coordinate $X_{World}^R$ of that midpoint, can be estimated by:

$$Z_{World}^R = Z_{World}^F - L \cdot \cos(\alpha) \quad (24)$$

$$X_{World}^R \approx -\frac{C_0 \cdot Z_{World}^{R2}}{2} \quad (25)$$

The corresponding coordinates along the left rear tire track 96', 96.2' and right rear tire track 96", 96.2" can then be estimated as:

$$Track_{LR} = \left(X_{World}^R - \frac{W_R \cdot \cos(\alpha)}{2}, Z_{World}^R - \frac{W_R \cdot \sin(\alpha)}{2}\right) \quad (26)$$

$$Track_{RR} = \left(X_{World}^R + \frac{W_R \cdot \cos(\alpha)}{2}, Z_{World}^R + \frac{W_R \cdot \sin(\alpha)}{2}\right) \quad (27)$$

wherein $W_R$ is the track width between the rear tires 94.2', 94.2".

Given any of the above predicted track locations, i.e. $Track_{LF}$, $Track_{RF}$, $Track_{LR}$, $Track_{LR}$—the cross-range $X_{World}$ and down-range $Z_{World}$ coordinates of which are generally respectively designated as $X_{World}^{Track}$ and $Z_{World}^{Track}$, respectively—the corresponding image coordinates of the track locations are given by:

$$X_{Image}^{Track} = \frac{f_X \cdot X_{World}^{Track}}{Z_{World}^{Track} \cdot \cos(\varphi) + (h_C - 0) \cdot \sin(\varphi)} \quad (28)$$

$$I_{COL}^{Track} = X_{Image} + \frac{N_{COLS}}{2} + .5 \quad (29)$$

$$Y_{Image}^{Track} = \frac{f_Y \cdot (Z_{World}^{Track} \cdot \sin(\varphi) - (h_C - 0) \cdot \cos(\varphi))}{Z_{World}^{Track} \cdot \cos(\varphi) + (h_C - 0) \cdot \sin(\varphi)} \quad (30)$$

$$J_{ROW}^{Track} = -Y_{Image}^{Track} + \frac{N_{ROWS}}{2} + .5, \quad (31)$$

Then, from the down-range coordinate $Z_{World}$ values given by equation (13) from the range map image 28, the corresponding elevation coordinate $Y_{World}$ of the track locations is given by:

$$Z_{World}^{Track} = Z_{World}^{Track}(I_{COL}^{Track}, J_{ROW}^{Track}) \quad (32)$$

which, when substituted into equation (7.1), gives the corresponding elevation coordinate $Y_{World}^{Track}$ for each of k points for the associated tiles 98' along each of the left front tire track 96', 96.1', the right front tire track 96", 96.1", the left rear tire track 96', 96.2', and the right rear tire track 96", 96.2":

$$Y_{World}^{Track} = h_C - \frac{Z_{World}^{Track} \cdot (f_Y \cdot \sin(\varphi) - Y_{Image}^{Track} \cdot \cos(\varphi))}{f_Y \cdot \cos(\varphi) + Y_{Image}^{Track} \cdot \sin(\varphi)}. \quad (33)$$

The above elevation coordinates $Y_{World}^{Track}$ can be obtained to the extent that associated disparities DX of the associated real-world points 70 can be resolved by the stereo vision image processor 26, either for portions of the roadway surface 48' not illuminated by the first 16.1 and second 16.2 fan beams of light, but given sufficient natural lighting and associated texture of the roadway surface 48', or if light projection system 18, 18.1, 18.2 is adapted to aximuthally rotate the first 16.1 and second 16.2 fan beams of light so as to provide for illuminating the curved path 14\*. For example, the light projection system 18, 18.1, 18.2 can be operatively coupled to the vehicle steering system 120 so as to provide for automatically aximuthally rotating the first 16.1 and second 16.2 fan beams of light as the vehicle is steering, so as to provide for illuminating the roadway surface 48' along the projected curved left 96' and right 96" tire tracks of the curved path 14\* of the vehicle 12, for example, similar to how vehicular headlights are rotated in some vehicles 12. FIGS. 19-21 respectively illustrate left 96' and right 96" tire tracks having corresponding curvatures of 0.03 radians per meter, 0.035 radians per meter, and 0.09 radians per meter, respectively.

The centerline 116 of the curved path 14\* within a curved lane of a roadway 48 may be alternatively estimated as the center of the corresponding lane, the latter of which is otherwise characterized in accordance with any of the following U.S. patents commonly assigned with the instant application: U.S. Pat. No. 7,522,091 B2 that issued on 21 Apr. 2009, U.S. Pat. No. 7,626,533 B2 that issued on 1 Dec. 2009, or U.S. Pat. No. 7,034,742 B2 that issued on 25 Apr. 2006. As a second alternative, the associated lane boundaries of a curved lane of a roadway 48 may be estimated using an image-based lane detection system that provides for finding the trajectory of the vehicle 12 using lane marker identification together with piece-wise linear modeling to predict the future path 14 of the vehicle 12.

Figure 22A:
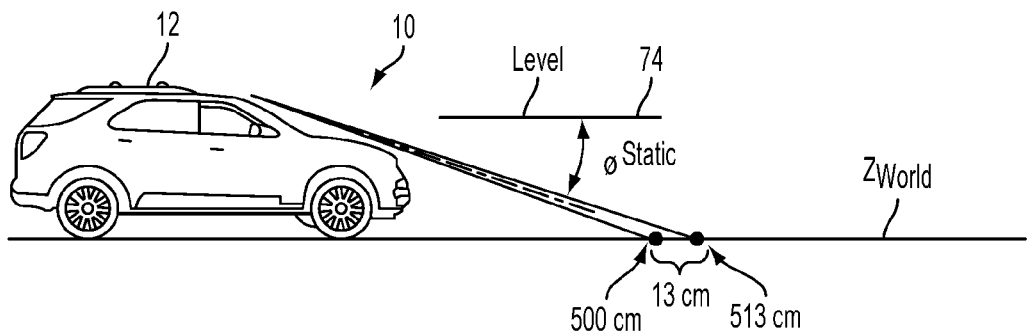
FIG. 22a illustrates a vehicle in a level pitch attitude, projecting two rays of light from a forward-looking vehicular path sensing system, showing the locations of corresponding points projected on the roadway surface.
Figure 22B:
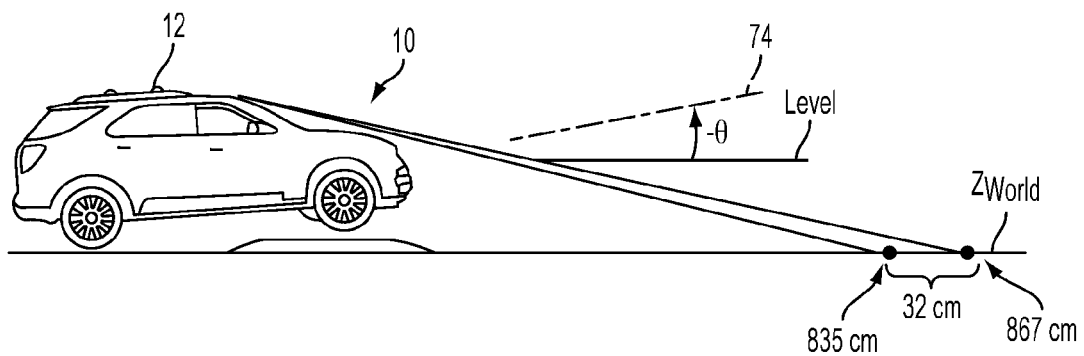
FIG. 22b illustrates the same vehicle illustrated in FIG. 22a, but pitched upwards at an angle of 6 degrees.
Figure 22C:
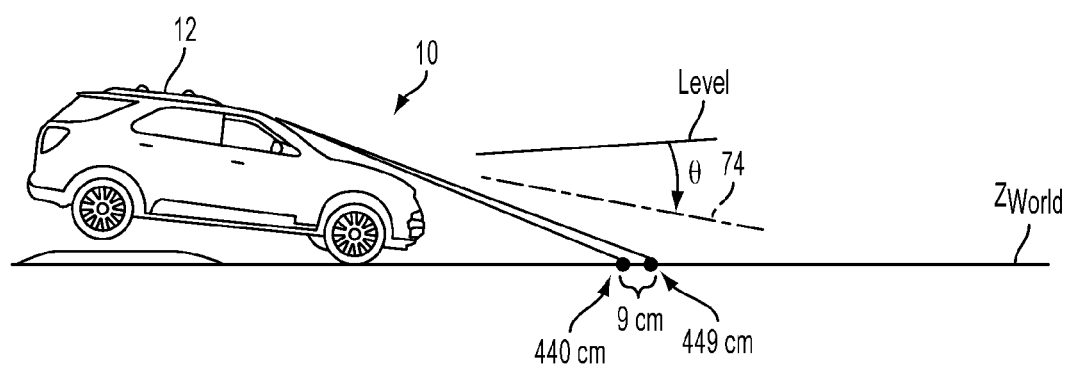
FIG. 22c illustrates the same vehicle illustrated in FIGS. 22a and 22b, but pitched downwards at an angle of 6 degrees.

Referring to FIGS. 22a-c, in respect of step (1140) of the road surface preview process 1100 illustrated in FIG. 11, for given first 122.1 and second 122.2 rays of a given fan beam of light 16, having a given fixed angular separation therebetween, the down-range coordinates $Z_{World}$ of the corresponding first 70.1 and second 70.2 real-world points at the intersection of the first 122.1 and second 122.2 rays with a flat roadway surface 48' varies with vehicle pitch angle θ, as does the separation therebetween. For example, FIG. 22a illustrates a vehicle 12 on a flat roadway surface 48' at a vehicle pitch angle θ=0 degrees, wherein the resulting associated resulting corresponding two real-world points 70.1, 70.2 are located at corresponding down-range coordinates $Z_{World}$, of 500 centimeters and 513 centimeters respectively, so as to be separated by 13 centimeters.

By comparison, with the vehicle pitched upwards by 6 degrees, i.e. at vehicle pitch angle θ=+6 degrees, as illustrated in FIG. 22b, for the same first 122.1 and second 122.2 rays and flat roadway surface 48' as in FIG. 22a, the resulting corresponding two real-world points 70.1, 70.2 are located at corresponding down-range coordinates $Z_{World}$, of 835 centimeters and 867 centimeters respectively, so as to be separated by 32 centimeters. Similarly, with the vehicle pitch downwards by 6 degrees, i.e. at vehicle pitch angle θ=−6 degrees, as illustrated in FIG. 22c, for the same first 122.1 and second 122.2 rays and flat roadway surface 48' as in FIGS. 22a and 22b, the resulting corresponding two real-world points 70.1, 70.2 are located at corresponding down-range coordinates $Z_{World}$, of 440 centimeters and 449 centimeters respectively, so as to be separated by 9 centimeters. Accordingly, as the vehicle 12 pitches upwards, the values of the down-range coordinates $Z_{World}$ of the real-world points 70 increase, as does the separation between different relatively-longitudinally separated real-world points 70, and as the vehicle 12 pitches downwards, the values of the down-range coordinates $Z_{World}$ of the real-world points 70 decrease, as does the separation between different relatively-longitudinally separated real-world points 70, which provides for inferring the vehicle pitch angle θ from the separation in down-range coordinates $Z_{World}$ of different relatively-longitudinally separated real-world points 70, or from the some or all of the totality of separations of all the different relatively-longitudinally separated real-world points 70. For example, referring again to FIG. 2, in one set of embodiments, this vehicle pitch angle θ is an additional input to the variable-damping electronic suspension control system 42' for controlling the vehicle suspension system 108, 110. The effect of I θ can be distinguished from local elevational effects of the real-world points 70 because changes of vehicle pitch angle θ affect all of the real-world points 70 in a predictable way, the effect of which can be accounted for prior to analyzing for local elevational effects.

Figure 23:
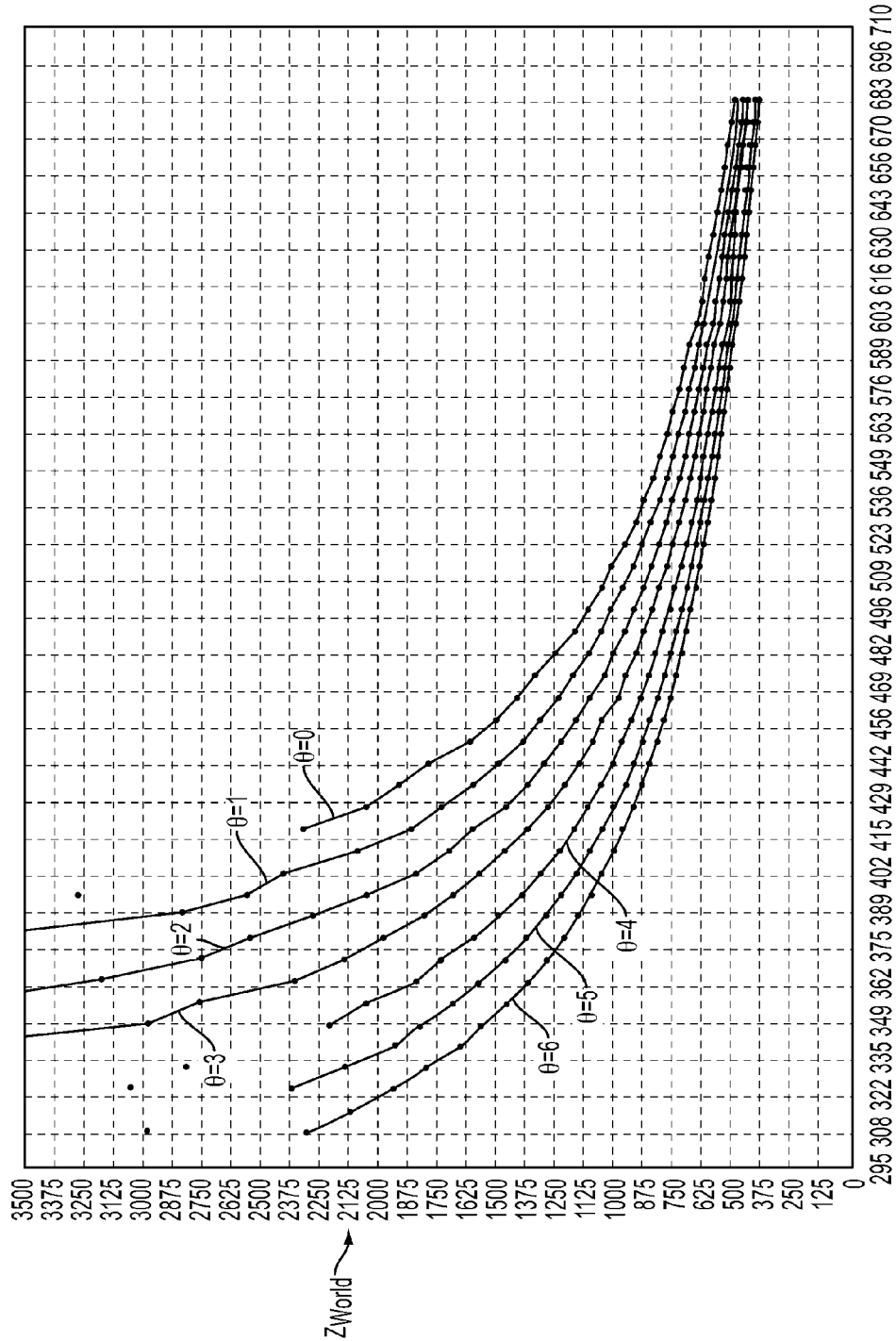
FIG. 23 illustrates a plot of down range coordinate in real space as a function of image row coordinate in image space for families of vehicle pitch angle.

Referring to FIG. 23, for a given set of rays 122 of a given fan beam of light 16 projected onto corresponding real-world points 70 on a flat roadway surface 48', the locations of the of the corresponding image points 66 in the associated first 30.1 and second 30.2 images and associated range map image 28 is relatively invariant with respect to vehicle pitch angle θ because both the light projection system, 18, 18.1, 18.2 and the stereo vision system 22 of the vehicular path sensing system 10 are fixed relative to one another in the vehicle 12. More particularly, FIG. 23 illustrates plots of down-range coordinates $Z_{World}$ (in centimeters) in real space 72 as function of row coordinate $J_{ROW}$ in image space 68 for each of a plurality of relatively-longitudinally separated real-world points 70 associated with a corresponding plurality of rays 122 of a fan beam of light 16 when projected onto a flat roadway surface 48', for a families of vehicle pitch angle θ of level and six different increasingly downward pitch angles of 0 to 6 degrees in 1 degree increments, wherein it can be seen that the row coordinate $J_{ROW}$ associated with each real-world point 70 is substantially invariant with respect to vehicle pitch angle θ, and that for any pair of real-world points 70, the slope therebetween of any of the plots of FIG. 23 decreases with decreasing vehicle pitch angle θ (i.e. increasing magnitude of downward vehicle pitch angle θ), corresponding to a decreasing difference between associated down-range coordinate $Z_{World}$ values, consistent with the illustration of FIG. 22c in relation to FIG. 22a.

For a given pair of down-range separated points in image space 68 having corresponding down-range coordinate $Z_{World}$ values, the relationships illustrated in FIG. 23 may be transformed into a relationship—either a table lookup or a function—of vehicle pitch angle θ as a function of the difference between the associated down-range coordinate $Z_{World}$ values. Accordingly, in accordance with one aspect, the down-range coordinate $Z_{World}$ values are determined from the range map image 28 for a pair of down-range separated locations corresponding to those used to develop the above-described table lookup or functional relationship, which then is used to determine the corresponding vehicle pitch angle θ, which may be done for a plurality of sets of image point 66, from which a corresponding averaged vehicle pitch angle θ may be determined.

Figure 24:
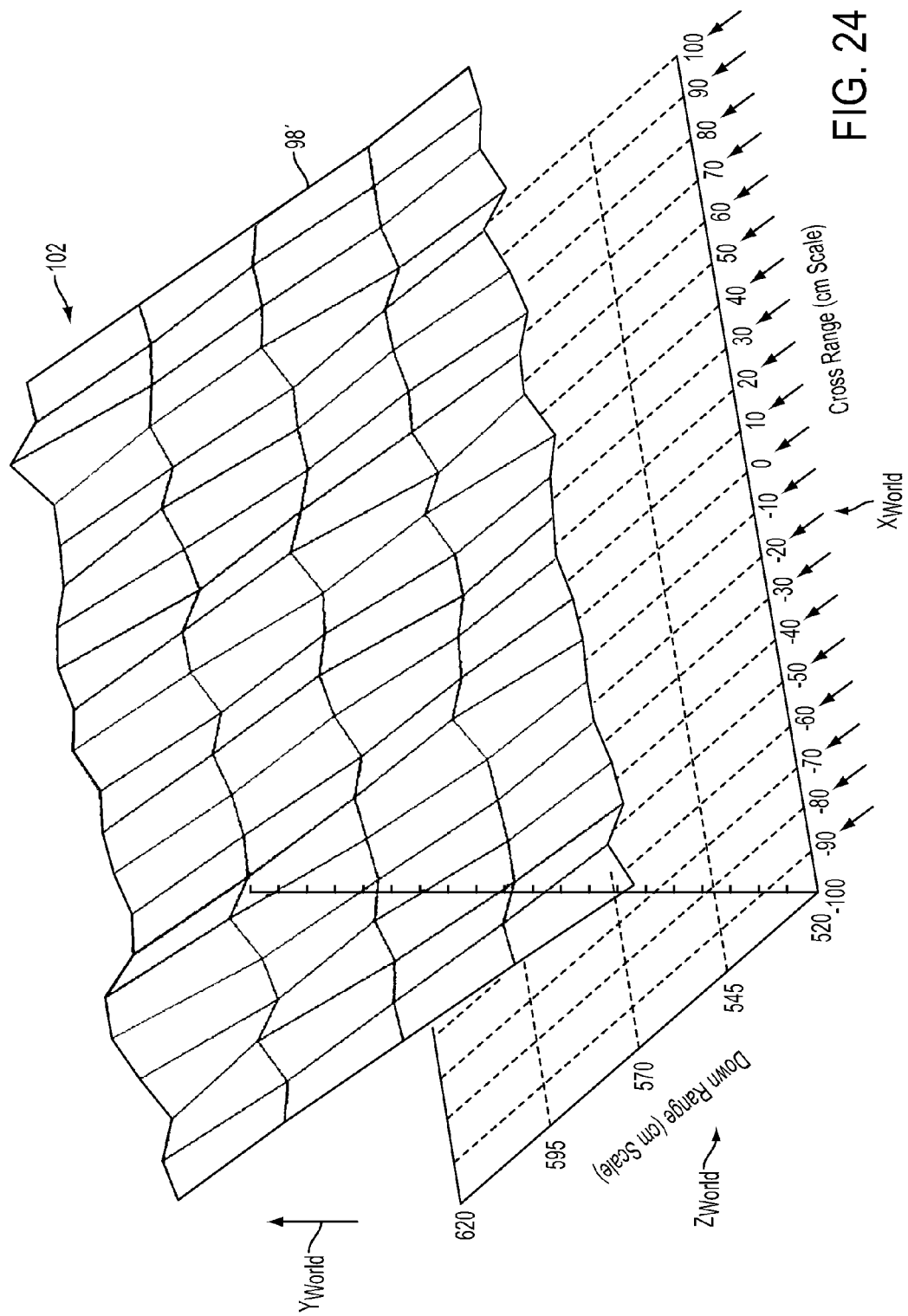
FIG. 24 illustrates an isometric view of an elevation profile of the set of set of tiles similar to those illustrated in FIG. 13.

Alternatively, referring to FIG. 24, the vehicle pitch θ and roll β angles may be determined by analysis of the above-described pitch/roll analysis patch 102. For example, in accordance with one embodiment, the vehicle pitch angle θ is given by summing the calculated pitch angles of the pitch/roll analysis patch 102 at each associated cross-range coordinate $X_{World}$ at the associated tile boundaries (indicated by arrows in FIG. 24), and dividing by the number of valid pitch angles in the sum, or:

$$\theta = \frac{\sum_{X_{World}=X_{World}^{Left}}^{X_{World}^{Right}} \tan^{-1}\left(\frac{\Delta Y_{World}(X_{World})}{\Delta Z_{World}(X_{World})}\right)}{N_{Valid}} \tag{34}$$

wherein:

$$\Delta Y_{World}(X_{World})=Y_{World}(X_{World},Z_{World}^{Max})-Y_{World}(X_{World},Z_{World}^{Min}), \text{ and} \tag{35.1}$$

$$\Delta Z_{World}(X_{World})=Z_{World}^{Max}-Z_{World}^{Min}, \tag{36.1}$$

or $$\Delta Y_{World}(X_{World})=Y_{World}(X_{World},Z_{World}^{Min})-Y_{World}(X_{World},Z_{World}^{Max}), \text{ and} \tag{35.2}$$

$$\Delta Z_{World}(X_{World})=Z_{World}^{Min}-Z_{World}^{Max}, \tag{36.2}$$

$N_{Valid}$ is the number of calculated pitch angles for which associated down-range coordinate $Z_{World}$ and elevation coordinate $Y_{World}$ values are available, $Z_{World}^{Min}$ is the minimum down-range coordinate $Z_{World}$ of the pitch/roll analysis patch 102, $Z_{World}^{Max}$ is the maximum down-range coordinate $Z_{World}$ of the pitch/roll analysis patch 102, $X_{World}^{Left}$ is the left-most cross-range coordinate $X_{World}$ of the pitch/roll analysis patch 102, and $X_{World}^{Right}$ is the right-most cross-range coordinate $X_{World}$ of the pitch/roll analysis patch 102.

As another example, in accordance with another embodiment, the vehicle roll angle β is given by summing the calculated roll angles of the pitch/roll analysis patch 102 at each associated down-range coordinate $Z_{World}$ at the associated tile boundaries, and dividing by the number of valid pitch angles in the sum, or:

$$\beta = \frac{\sum_{Z_{World}=Z_{World}^{Min}}^{Z_{World}^{Max}} \tan^{-1}\left(\frac{\Delta Y_{World}(Z_{World})}{\Delta X_{World}(Z_{World})}\right)}{N_{Valid}} \tag{37}$$

wherein:

$$\Delta Y_{World}(Z_{World})=Y_{World}(X_{World}^{Right},Z_{World})-Y_{World}(X_{World}^{Left},Z_{World}), \text{ and} \tag{38.1}$$

$$\Delta X_{World}(Z_{World})=X_{World}^{Right}-X_{World}^{Left}, \tag{39.1}$$

or $$\Delta Y_{World}(Z_{World})=Y_{World}(X_{World}^{Left},Z_{World})-Y_{World}(X_{World}^{Right},Z_{World}), \text{ and} \tag{38.2}$$

$$\Delta X_{World}(Z_{World})=X_{World}^{Left}-X_{World}^{Right}, \text{ and} \tag{39.2}$$

$N_{Valid}$ is the number of calculated pitch angles for which associated cross-range coordinate $X_{World}$ and elevation coordinate $Y_{World}$ values are available.

The fidelity of the sensed elevation coordinate $Y_{World}$ depends upon three aspects, as follows: 1) the manner the rays 122 of the fan beam of light 16 follows the surface 14' of the path 14 at associated real-world points 70 thereon, or an object thereupon, 2) the visibility of the real-world points 70 by the associated stereo vision system 22, and 3) the degree to which the actual location of the real-world point 70 can be ascertained from the corresponding first 30.1 and second 30.2 images captured by the stereo vision system 22.

For example, referring to FIG. 25, a hypothetical circular-cross-section elevation profile 124—also referred to as a circular profile 124—centered on the roadway surface 48' at various locations relative to the vehicle 12, corresponding to various points in time for the vehicle 12 traveling therealong, wherein the top portion $124^T$ thereof represents the surface of a circular-cross-section bump 126—also referred to as a circular bump 126—along the path 14, and the bottom portion $124^B$ thereof represents the surface of a circular-cross-section dip 128—also referred to as a circular dip 128—along the path 14. FIG. 25 illustrates a ray 122 from a fan beam of light 16 projected from the vehicle 12 that intersects the flat roadway surface 48' at a corresponding nominal longitudinal location $Z_0$.

In FIG. 25, the circular profile 124 is illustrated at five different relative longitudinal locations ($Z(t_1)$, $Z(t_2)$, $Z(t_3)$, $Z(t_4)$, $Z(t_5)$) relative to vehicle 12, for example, corresponding to five different points in time $t_1$, $t_2$, $t_3$, $t_4$, $t_5$ for the vehicle 12 traveling in the positive Z direction, wherein the relatively fixed circular profile 124 is separately identified at each corresponding point in time in FIG. 25 by a corresponding index of relative position, i.e. 124.1, 124.2, 124.3, 124.4, 124.5.

For example, at a first point in time $t_1$ and a corresponding first relative longitudinal location ($Z(t_1)$), the leading edge 130 of the corresponding circular profile 124, 124.1 is beyond the nominal longitudinal location $Z_0$ so as to not interact with the ray 122, so that the light therefrom remain located on the flat roadway surface 48' at the corresponding respective nominal longitudinal location $Z_0$ at the elevation of the flat roadway surface 48'.

At the second point in time $t_2$ and a corresponding second relative longitudinal location ($Z(t_2)$), the leading edge 130 of the corresponding circular profile 124, 124.2 is at the nominal longitudinal location $Z_0$, so that for the circular bump 126 as illustrated, the ray 122 projects onto an elevated location 132.2 that is beginning to rise up on a forward portion 134 thereof, whereas for the circular dip 128 as illustrated, the ray 122 projects a real-world point 70 onto a corresponding depressed location 136.2 on a relatively-aft portion 138 of the circular dip 128 at a corresponding maximum-detectable depth 140, so that elevation the real-world point 70 makes a corresponding downward step transition to a location below the nominal location of the real-world point 70 on an otherwise flat roadway surface 48'. Accordingly, the ray 122 is blind to a forward portion 142 of the circular dip 128 forward of the corresponding location of maximum-detectable depth 140 because of shadowing by the leading edge 130 of the corresponding circular profile 124, 124.2, wherein the extent of the shadowed forward portion 142 of the circular dip 128 depends upon the geometry of the ray 122 in relation to that of the circular profile 124, 124.2.

At the third point in time $t_3$ and a corresponding third relative longitudinal location ($Z(t_3)$), the center of the corresponding circular profile 124, 124.3 is at the nominal longitudinal location $Z_0$, so that for the circular bump 126 as illustrated, the ray 122 projects onto an elevated location 132.3 on the forward portion 134 of the circular bump 126, above the corresponding elevation that would result if otherwise on the flat roadway surface 48', whereas for the circular dip 128 as illustrated, the ray 122 projects onto a corresponding depressed location 136.3 on the relatively-aft portion 138 of the circular dip 128 at a depth less than the maximum-detectable depth 140 at the second point in time $t_2$.

At the fourth point in time $t_4$ and a corresponding fourth relative longitudinal location ($Z(t_4)$), the center of the corresponding circular profile 124, 124.4 is at a location such that for the circular dip 128 as illustrated, the ray 122 projects at the trailing edge 144 of the circular dip 128 at the elevation of the roadway surface 48'. Thereafter, as the vehicle 12 continues to move in the +Z direction, for the circular dip 128 as illustrated, the ray 122 continues to project onto the roadway surface 48' at the elevation thereof. For the circular bump 126 as illustrated, the ray 122 projects onto an elevated location 132.4 on the forward portion 134 of the circular bump 126, above the corresponding elevation that would result if otherwise on the flat roadway surface 48', and above the corresponding elevated location 132.3 at the third point in time $t_3$.

At the fifth point in time $t_5$ and a corresponding fifth relative longitudinal location ($Z(t_5)$), the corresponding circular profile 124, 124.5 is at an elevated location 132.5 such that the ray 122 is tangent to the circular bump 126 at a relatively-further-distant location than the location of maximum elevation 146 of the circular bump 126. Thereafter, as the vehicle 12 continues to move in the +Z direction, for the circular bump 126 as illustrated, the ray 122 will no longer intersect the circular bump 126, but instead will project onto the roadway surface 48' at the elevation thereof.

Figure 27:
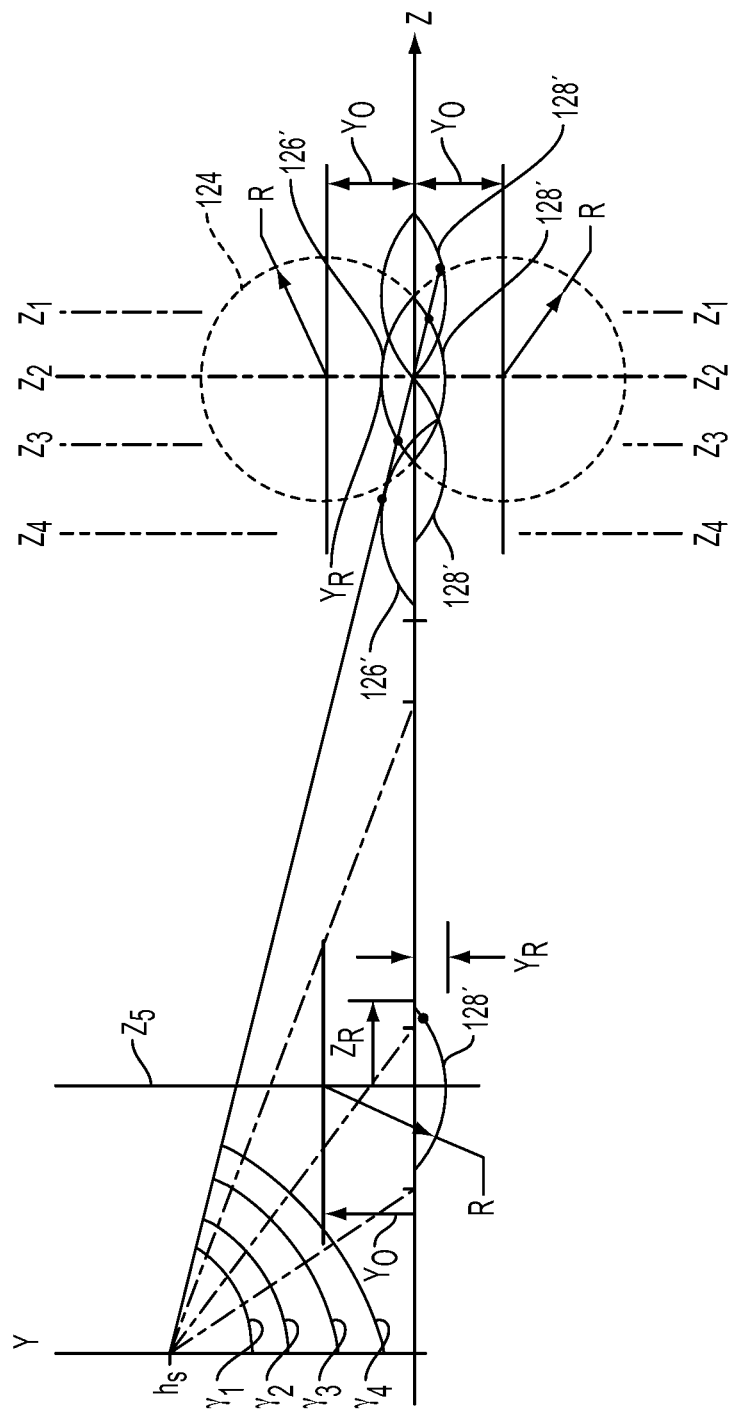
FIG. 27 illustrates geometries of a dip and a bump in a road surface in relation to a plurality of rays of light projected thereupon, at various separations from the source of the ray of light, as used to develop the plots of FIGS. 28-31.

Returning in greater detail to the first two aspects affecting the fidelity of the sensed elevation coordinate $Y_{World}$, referring to FIG. 27, there is illustrated a flat roadway surface 48' in relation to a fan beam of light 16—projecting from a height $h_S$ above the roadway surface 48'—with a set of four rays of light $122^{(1)}$, $122^{(2)}$, $122^{(3)}$, $122^{(4)}$ at corresponding different projection elevation angles $\gamma_1$, $\gamma_2$, $\gamma_3$, $\gamma_4$ downwards relative to horizontal. Similar to that illustrated in FIG. 25, perturbations to the otherwise flat roadway surface 48' are illustrated with circular bump 126' and circular dip 128' disturbances, each with a respective corresponding similarly-sized circular profile 124', 124", the centers 146 of which are each offset by an offset distance $Y_0$, either below the flat roadway surface 48' for a circular bump 126', or above the flat roadway surface 48' for a circular dip 128', as illustrated in FIG. 27, so as to provide for modeling more-typical disturbances of a roadway surface 48' that can be substantially followed by the tires 94 of the vehicle 12, i.e. for which the radius R of the circular profiles 124', 124" is at least a great at the radius of the tire 94. Similar to that illustrated in FIG. 25, the centers 146 of the circular bump 126' and circular dip 128' are illustrated at various relative longitudinal locations $Z_1$, $Z_2$, $Z_3$, $Z_4$, $Z_5$, for example, at corresponding successively increasing points in time $t_1$, $t_2$, $t_3$, $t_4$, $t_5$, for a vehicle 12 traveling in the positive Z direction relative to a single stationary circular bump 126' or circular dip 128', similar to the scenarios described in respect of FIG. 25 but with the relative longitudinal locations $Z_1$, $Z_2$, $Z_3$, $Z_4$, $Z_5$ measured relative to the common location of the source of the fan beam of light 16.

Accordingly, as the vehicle 12 travels in the positive Z direction, the circular bump 126' or circular dip 128' is first illuminated by the first ray of light $122^{(1)}$, then by the second ray of light $122^{(2)}$, then by the third ray of light $122^{(3)}$, and finally by fourth ray of light $122^{(4)}$. At any given point in time, for a particular ray of light 122 intersecting a particular circular bump 126' and circular dip 128', the resulting real-world point 70 defining the point of intersection can be mathematically located at the intersection of the ray of light 122 with the associated circular profile 124', 124". For example, at the second point in time $t_2$, for which the longitudinal location $Z_2$ of the circular bump 126' or circular dip 128' is the same as the nominal longitudinal location $Z_0^{(1)}$ of the real-world point 70$^{(1)}$ when on a flat roadway surface 48', the first ray of light 122$^{(1)}$ intersects the corresponding circular bump 126.2' at a first longitudinal location $Z=Z_a$, and intersects the corresponding circular dip 128.2' at a second longitudinal location $Z=Z_b$, wherein the first longitudinal location $Z_a$ is closer to the vehicle 12 than the second longitudinal location $Z_b$.

For the path 14 in accordance with FIG. 27, the ray of light 122 is modeled as a line 122':

$$Y = m \cdot Z + h_S, \quad (40)$$

the slope m of which is given by:

$$m = -\frac{h_S}{Z_0}, \quad (41)$$

recalling that $h_S$ is the fixed common height of the source of the rays of light 122$^{(1)}$, 122$^{(2)}$, 122$^{(3)}$, 122$^{(4)}$ above the roadway surface 48', and $Z_0$ is the fixed location of the real-world point 70 when projected onto a flat roadway surface 48', relative to the vehicle 12.

The circular profiles 124', 124" of the circular bump 126' or circular dip 128' centered at $Y=Y_0$ and $Z=Z_S$ are modeled as:

$$(Y-Y_0)^2 + (Z-Z_S)^2 = R^2, \quad (42)$$

wherein $Y_0 > 0$ for the circular dip 128', $Y_0 < 0$ for the circular bump 126' and $Z_S$ is the longitudinal distance from the common location of the source of the rays of light 122$^{(1)}$, 122$^{(2)}$, 122$^{(3)}$, 122$^{(4)}$ to the center of the circular profile 124', 124", and accordingly provides a measure of the location of the vehicle 12 relative to the circular bump 126' or circular dip 128".

The real-world point 70 is located at the intersection of the line 122' and the circular profiles 124', 124", found by the substituting equations (34) and (35)) into equation (36) as follows:

$$\left(-h_S \cdot \left(\frac{Z}{Z_0}\right) + (h_S - Y_0)\right)^2 + (Z - Z_S)^2 = R^2. \quad (43)$$

Reformulating equation (37) as a second order polynomial with respect to $$\left(\frac{Z}{Z_0}\right)$$

gives:

$$(Z_0^2 + h_S^2)\left(\frac{Z}{Z_0}\right)^2 - 2(h_S(h_S - Y_0) + Z_0 \cdot Z_S)\left(\frac{Z}{Z_0}\right) + \quad (44)$$
$$(Z_S^2 + (h_S - Y_0)^2 - R^2) = 0, \text{ or}$$

$$a\left(\frac{Z}{Z_0}\right)^2 + b\left(\frac{Z}{Z_0}\right) + c = 0, \quad (45)$$

which has the following solutions:

$$\left(\frac{Z}{Z_0}\right) = -\frac{b}{2a} \pm \sqrt{b^2 - 4ac}. \quad (46)$$

The resulting Z coordinate of the real-world point 70 are then given by:

$$Z = Z_0 \cdot \left(\frac{Z}{Z_0}\right). \quad (47)$$

From equation (36), the corresponding Y coordinate of the real-world point 70 on a circular bump 126' (+) and circular dip 128" (−) are then given by:

$$Y = Y_0 \pm \sqrt{R^2 - (Z - Z_S)^2}. \quad (48)$$

The Y and Z locations of the real-world point 70 can be normalized with respect to the corresponding maximum elevation $Y_R$ of the circular bump 126' or circular dip 128", and the half-chord length $Z_R$ that are respectively given as:

$$Y_R = R - Y_0, \text{ and} \quad (49)$$

$$Z_R = \sqrt{R^2 - Y_0^2}. \quad (50)$$

Figure 28:
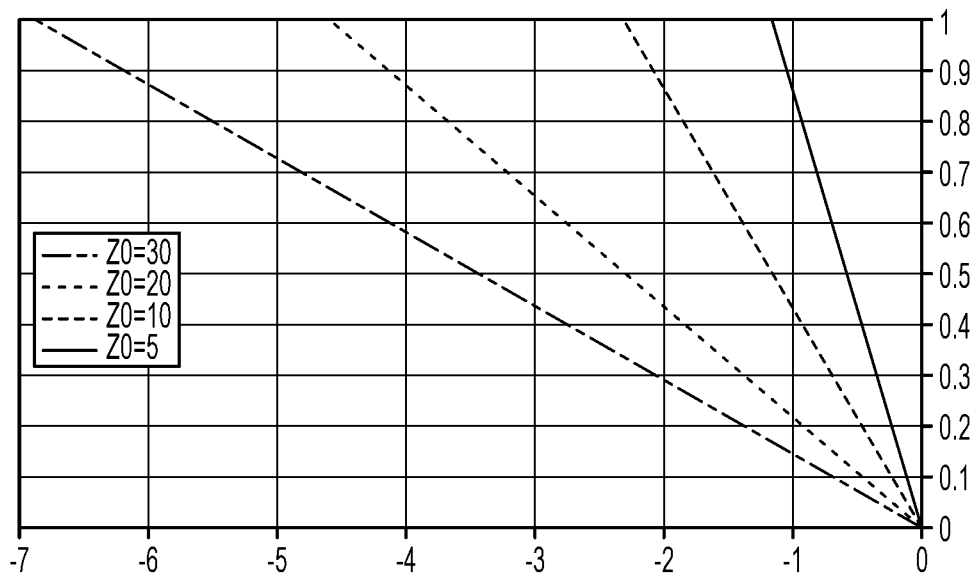
FIG. 28 illustrates a family of plots of normalized elevation of a point of light projected onto a dip in a road surface by a corresponding ray of light, for the various corresponding light ray projection geometries illustrated in FIG. 27.
Figure 29:
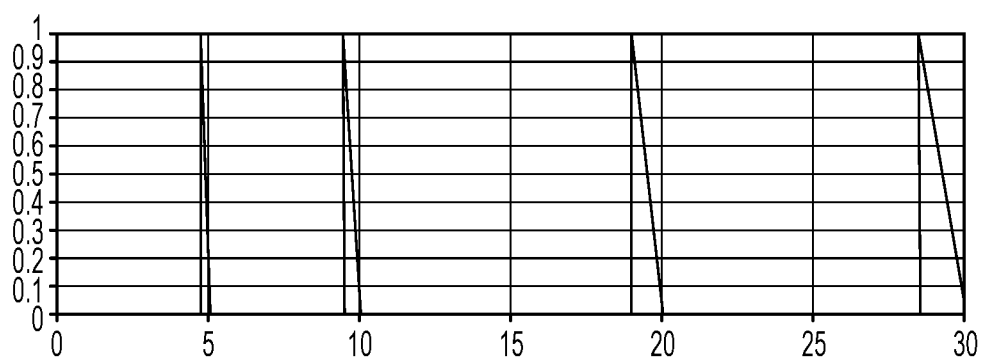
FIG. 29 illustrates a plot of normalized elevations of light points projected onto a dip in a road surface for a range of distances of the dip from the sources of the corresponding rays of light for the light ray projection geometries as illustrated in FIG. 27.
Figure 30:
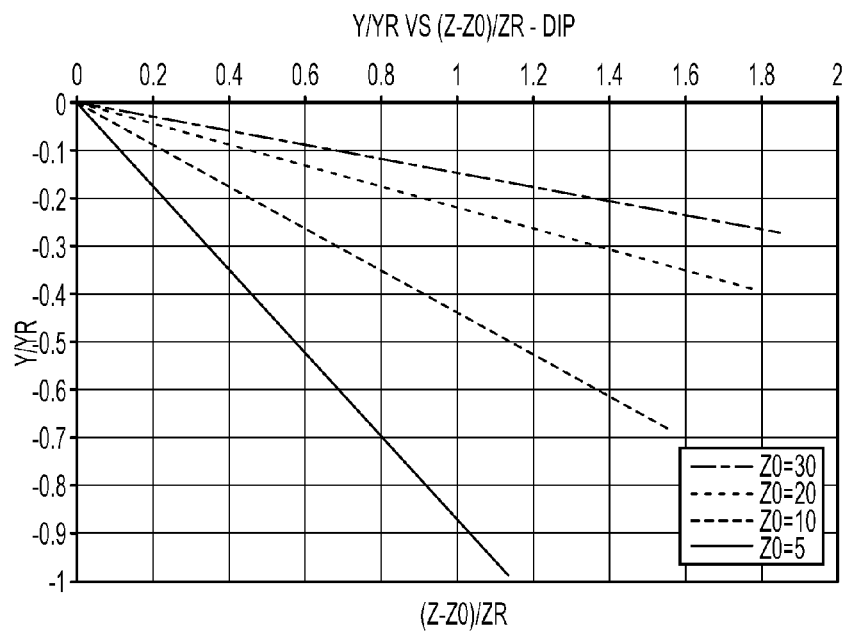
FIG. 30 illustrates a family of plots of normalized elevation of a light point projected onto a bump on a road surface by a corresponding ray of light, for the various corresponding light ray projection geometries illustrated in FIG. 27.
Figure 31:
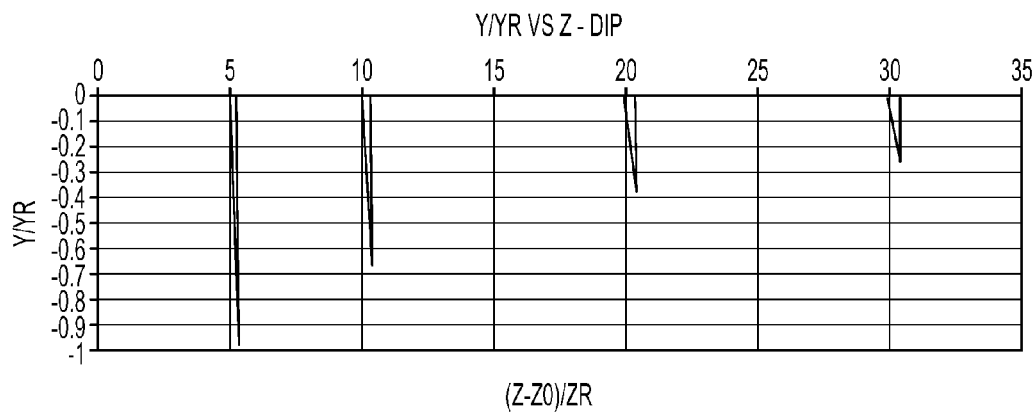
FIG. 31 illustrates a plot of normalized elevations of light points projected onto a bump on a road surface for a range of distances of the dip from the sources of the corresponding rays of light for the light ray projection geometries as illustrated in FIG. 27.

With reference to the geometry of FIG. 27, referring to FIGS. 28-29 for a circular dip 128", and FIGS. 30-31 for a circular bump 126", the location of a real-world point 70 on a circular bump 126' and circular dip 128", respectively, was simulated for four different rays of light 122$^{(1)}$, 122$^{(2)}$, 122$^{(3)}$, 122$^{(4)}$ each originating from a height $h_S$ of 1 meter above the roadway surface 48' and projecting onto the roadway surface 48' at corresponding nominal longitudinal locations $Z_0^{(1)}$, $Z_0^{(2)}$, $Z_0^{(3)}$, $Z_0^{(4)}$ of respective 5, 10, 20 and 20 meters from the source of the rays of light 122$^{(1)}$, 122$^{(2)}$, 122$^{(3)}$, 122$^{(4)}$, wherein the radius R of the corresponding circular profiles 124', 124" was 0.5 meters, and the corresponding offset distances $Y_0$ were 0.45 meters for the circular dip 128", and −0.45 meters for the circular bump 126'.

More particularly, for a circular dip 128", FIG. 28 is a plot of normalized elevation $Y/Y_R$ of the real-world point 70 as a function of normalized relative longitudinal distance $(Z-Z_0)/Z_R$ relative to the corresponding nominal longitudinal location $Z_0^{(1)}$, $Z_0^{(2)}$, $Z_0^{(3)}$, $Z_0^{(4)}$ of the corresponding real-world point 70 of intersection, for each of the different rays of light 122$^{(1)}$, 122$^{(2)}$, 122$^{(3)}$, 122$^{(4)}$, wherein as described hereinabove for FIG. 25, the maximum detectable elevation Y is less than the maximum elevation $Y_R$ of the circular dip 128' as a result of shadowing by the leading edge 130 thereof, but increases with increasing projection elevation angle $\gamma_1, \gamma_2, \gamma_3, \gamma_4$ of the associated rays of light 122$^{(1)}$, 122$^{(2)}$, 122$^{(3)}$, 122$^{(4)}$ as the circular dip 128" becomes closer to the vehicle 12. This is further illustrated in FIG. 29 which is a plot of the normalized elevation $Y/Y_R$ of the real-world point 70 as a function of absolute longitudinal distance Z from the source of the rays of light 122$^{(1)}$, 122$^{(2)}$, 122$^{(3)}$, 122$^{(4)}$. Accordingly, the degree to which the maximum detectable depth of the real-world point 70 follows the actual maximum elevation $Y_R$ of the circular dip 128" improves with decreasing longitudinal distance $Z_s$ of the circular dip 128" relative to the vehicle 12.

Similarly, for a circular bump 126', FIG. 30 is a plot of normalized elevation $Y/Y_R$ of the real-world point 70 as a function of normalized relative longitudinal distance $(Z-Z_0)/Z_R$ relative to the corresponding nominal longitudinal location $Z_0^{(1)}$, $Z_0^{(2)}$, $Z_0^{(3)}$, $Z_0^{(4)}$ of the corresponding real-world point 70 of intersection, for each of the different rays of light $122^{(1)}$, $122^{(2)}$, $122^{(3)}$, $122^{(4)}$. FIG. 31 illustrates a corresponding plot of the normalized elevation $Y/Y_R$ of the real-world point 70 as a function of absolute longitudinal distance Z from the source of the rays of light $122^{(1)}$, $122^{(2)}$, $122^{(3)}$, $122^{(4)}$, which illustrates a relatively sharp drop-off in detectable elevation resulting from the above-described shadowing by the relatively forward portion 134 of circular bump 126'.

Referring again to FIGS. 29 and 31, the plurality of rays of light $122^{(1)}$, $122^{(2)}$, $122^{(3)}$, $122^{(4)}$ within a substantially common plane aligned with the longitudinal axis 44 of the vehicle 12 provide for repeatedly monitoring a common disturbance to or portion of the path 14, or object thereupon, with each ray of light $122^{(1)}$, $122^{(2)}$, $122^{(3)}$, $122^{(4)}$ over time at different times, so as to provide for improving an estimate of the associated elevation profile 38 over time. For example, either for a vehicle 12 traveling at a constant rate of speed, or if the speed of the vehicle 12 is accounted for, the abscissa axis of each of FIGS. 29 and 31 is also responsive to or relatable to time, so that knowing the nominal longitudinal location $Z_0^{(1)}$, $Z_0^{(2)}$, $Z_0^{(3)}$, $Z_0^{(4)}$ of the corresponding real-world points 70, the resulting time series can be transformed from a time domain to a spatial domain, for example, as illustrated in FIGS. 28 and 30, so as to provide for better analyzing the associated elevation profile 38 of the path 14, or object thereupon.

Referring to FIG. 32, the elevation profile 38 along a given tire track 96', 96" may be adapted to account for the compliance of the tires 94, wherein the elevations $Y_{World}$ of tiles 98 along the tire track 96', 96" is weighted responsive to the relative cross-range location of those tiles 98 with respect to the center of the associated tire track 96', 96". For example, typically the relatively central tiles 98" have a greater influence on the elevation $Y_{World}$ of the tire/wheel assembly 112 than do the relatively distal tiles 98''', so that the elevations $Y_{World}$ of the former would be weighted relatively more that the elevations $Y_{World}$ of the latter in determining the effective elevation $Y_{World}$ of the tire/wheel assembly 112. The particular relative weightings would depend upon the type and size of the tires 94. For example, for the embodiment illustrated in FIG. 32, the tire track 96', 96" spans six tiles in cross range, with four relatively central tiles 98" having a weighting factor of 0.18, and two relatively distal tiles 98''' having a weighting factor of 0.14, the sum of the weighting factors being unity.

Equations (16)-(17.1) assume that the elevation $Y_{World}$ of the tire/wheel assembly 112 follows that of the elevation profile 38 along a given tire track 96', 96". Referring to FIGS. 33a and 33b, the estimate of the elevation $Y_{World}$ of the tire/wheel assembly 112 can be improved by accounting for the geometry of the tire 94 in relation to the associated elevation $Y_{World}$ of the surface 14' over which the tire 94 rolls. For example, FIGS. 33a and 33b illustrates the interaction of a tire 94 of radius R encountering a sharp-edged object 148 of height Y, wherein the tire 94 is moving towards the object 148 at a velocity v, with the tire 94 just beginning to contact the object 148 in FIG. 33a. The initial elevation $y_0$ of the center 150 of the tire/wheel assembly 112 relative to the top 148.2 of the object 148, and the initial path distance $x_0$ from the center 150 of the tire/wheel assembly 112 to the leading edge 148.1 of the object 148, are respectively given by:

$$y_0 = R - Y. \tag{51}$$

$$x_0 = \sqrt{R^2 - y_0^2} = \sqrt{R^2 - (R-Y)^2} = \sqrt{(2R-Y) \cdot Y}. \tag{52}$$

The path distance x from the center 150 of the tire/wheel assembly 112 to the leading edge 148.1 of the object 148 responsive to the forward motion of the tire 94 is then given by:

$$x = x_0 - v \cdot t. \tag{53}$$

Referring to FIG. 33b, the elevation y of the center 150 of the tire/wheel assembly 112 relative to the top 148.2 of the object 148 as the tire 94 rolls over the object 148 is then given by:

$$y = \sqrt{R^2 - x^2} = \sqrt{R^2 - (x_0 - v \cdot t)^2}. \tag{54}$$

from which, the vertical velocity of the center 150 of the tire/wheel assembly 112 is then given by:

$$\frac{dy}{dt} = \frac{v \cdot (v \cdot t - x_0)}{\sqrt{R^2 - (x_0 - v \cdot t)^2}}. \tag{55.1}$$

or:

$$\frac{dy}{dt} = \frac{v \cdot \left(v \cdot t - \sqrt{(2R-Y) \cdot Y}\right)}{\sqrt{R^2 - \left(\sqrt{(2R-Y) \cdot Y} - v \cdot t\right)^2}}. \tag{55.2}$$

The vertical acceleration of the center 150 of the tire/wheel assembly 112 could then be found by differentiating either equation (55.1) or (55.2). Accordingly, given an estimate of the elevation profile 38 which provides a value for the height Y in equations (51)-(55.2), equations (54)-(55.2) provide for an improved estimate of the kinematics of the tire/wheel assembly 112 relative to using the elevation profile 38 alone.

While specific embodiments have been described in detail in the foregoing detailed description and illustrated in the accompanying drawings, those with ordinary skill in the art will appreciate that various modifications and alternatives to those details could be developed in light of the overall teachings of the disclosure. It should be understood, that any reference herein to the term "or" is intended to mean an "inclusive or" or what is also known as a "logical OR", wherein when used as a logic statement, the expression "A or B" is true if either A or B is true, or if both A and B are true, and when used as a list of elements, the expression "A, B or C" is intended to include all combinations of the elements recited in the expression, for example, any of the elements selected from the group consisting of A, B, C, (A, B), (A, C), (B, C), and (A, B, C); and so on if additional elements are listed. Furthermore, it should also be understood that the indefinite articles "a" or "an", and the corresponding associated definite articles "the' or "said", are each intended to mean one or more unless otherwise stated, implied, or physically impossible. Yet further, it should be understood that the expressions "at least one of A and B, etc.", "at least one of A or B, etc.", "selected from A and B, etc." and "selected from A or B, etc." are each intended to mean either any recited element individually or any combination of two or more elements, for example, any of the elements from the group consisting of "A", "B", and "A AND B together", etc. Yet further, it should be understood that the expressions "one of A and B, etc." and "one of A or B, etc." are each intended to mean any of the recited elements individually alone, for example, either A alone or B alone, etc., but not A AND B together. Furthermore, it should also be understood that unless indicated otherwise or unless physically impossible, that the above-described embodiments and aspects can be used in combination with one another and are not mutually exclusive. Accordingly, the particular arrangements disclosed are meant to be illustrative only and not limiting as to the scope of the invention, which is to be given the full breadth of the appended claims, and any and all equivalents thereof.

What is claimed is:

1. A method of sensing a physical feature of or along a path of a vehicle, comprising:
  a. projecting at least one fan beam of light from a vehicle onto a path along which said vehicle can travel, wherein said at least one fan beam of light is oriented substantially along a direction of travel of said vehicle, each said at least one fan beam of light generates a corresponding at least one light stripe along a surface of said path, and said at least one fan beam of light is substantially aligned with a corresponding at least one corresponding tire track of said vehicle, so as to provide for said at least one fan beam of light to intersect said corresponding at least one corresponding tire track of said vehicle for a corresponding projected trajectory of said vehicle;
  b. capturing at least one pair of stereo image components of said at least one light stripe; and
  c. processing said at least one pair of stereo image components of said at least one light stripe so as to provide for sensing a physical feature of or along said path.

2. A method of sensing a physical feature of or along a path of a vehicle as recited in claim 1, wherein said at least one fan beam of light is turned off if a velocity of said vehicle is less than a threshold.

3. A method of sensing a physical feature of or along a path of a vehicle as recited in claim 1, wherein the operation of processing said at least one pair of stereo image components of said at least one fan beam of light comprises generating a corresponding at least one range map image from a corresponding said at least one pair of stereo image components, and the operation of processing said at least one pair of stereo image components of said at least one fan beam of light comprises determining at least one elevation profile of at least a portion of said path upon which said at least one fan beam of light is projected, wherein the operation of sensing a physical feature of or along said path is responsive to said at least one range map image, and the operation of determining said at least one elevation profile is responsive to said at least one range map image.

4. A method of sensing a physical feature of or along a path of a vehicle as recited in claim 3, wherein each elevation of said at least one elevation profile is determined responsive to a corresponding down-range value of said at least one range-map image and responsive to a corresponding pixel location in said at least one range-map image.

5. A method of sensing a physical feature of or along a path of a vehicle as recited in claim 3, wherein said at least one elevation profile comprises an elevation value for each of a plurality of tiles along a corresponding said at least one light stripe, wherein each tile of said plurality of tiles comprise a corresponding down-range extent and a corresponding cross-range extent, and different tiles of said plurality of tiles correspond to different locations along said at least one light stripe.

6. A method of sensing a physical feature of or along a path of a vehicle as recited in claim 5, further comprising determining at least one of a pitch angle of said vehicle or a roll angle of said vehicle responsive to either at least one set of at least two elevation values associated with corresponding said tiles at different down-range locations relative to said vehicle for a substantially common cross-range location relative to said vehicle, or at least one set of at least two elevation values associated with corresponding said tiles at different cross-range locations relative to said vehicle for a substantially common down-range location relative to said vehicle.

7. A method of sensing a physical feature of or along a path of a vehicle as recited in claim 6, wherein said tiles used to determine said at least one of said pitch angle or said roll angle are located within a relatively near-range subset patch of said tiles located along said path of said vehicle and substantially centered with respect to left and right tire tracks of said vehicle.

8. A method of sensing a physical feature of or along a path of a vehicle as recited in claim 3, further comprising determining at least one of a pitch angle of said vehicle or a roll angle of said vehicle responsive to either at least one set of at least two elevation values at different down-range locations relative to said vehicle for a substantially common cross-range location relative to said vehicle, or at least one set of at least two elevation values at different cross-range locations relative to said vehicle for a substantially common down-range location relative to said vehicle.

9. A method of sensing a physical feature of or along a path of a vehicle as recited in claim 8, further comprising correcting said at least one elevation profile so as to compensate for said pitch angle of said vehicle.

10. A method of sensing a physical feature of or along a path of a vehicle as recited in claim 8, wherein said at least one fan beam of light is projected forward of said vehicle, further comprising communicating said at least one elevation profile to a suspension control system of said vehicle so as to provide for controlling at least one element of a suspension system of said vehicle responsive to said pitch angle of said vehicle.

11. A method of sensing a physical feature of or along a path of a vehicle as recited in claim 8, wherein said at least one fan beam of light is projected forward of said vehicle, further comprising communicating said at least one elevation profile to a suspension control system of said vehicle so as to provide for controlling at least one element of a suspension system of said vehicle responsive to said roll angle of said vehicle.

12. A method of sensing a physical feature of or along a path of a vehicle as recited in claim 3, further comprising estimating at least one future path of at least one tire of said vehicle, wherein said at least one elevation profile is determined along said at least one future path of said at least one tire of said vehicle.

13. A method of sensing a physical feature of or along a path of a vehicle as recited in claim 3, further comprising estimating at least one future path of at least one tire of said vehicle, wherein said at least one elevation profile is determined along said at least one future path of said at least one tire of said vehicle, and said at least one elevation profile is determined from corresponding elevation values for each of a plurality of said tiles along said at least one future path of said at least one tire of said vehicle.

14. A method of sensing a physical feature of or along a path of a vehicle as recited in claim 13, wherein a cross-range extent of said tiles is sufficiently narrow so that each said at least one future path of said at least one tire of said vehicle laterally spans a plurality of said tiles, and each elevation value of said at least one elevation profile along said at least one future path is determined from a weighted average of corresponding elevation values of a corresponding said plurality of said tiles spanning different lateral locations.

15. A method of sensing a physical feature of or along a path of a vehicle as recited in claim 13, wherein the operation of estimating said at least one future path of said at least one tire of said vehicle comprises:
   a. generating an estimate of said at least one future path of said at least one tire of said vehicle with respect to world coordinates, responsive to measures of speed and yaw rate of said vehicle; and
   b. transforming said estimate of said at least one future path of said at least one tire of said vehicle from said world coordinates to image coordinates with respect to said at least one range-map image.

16. A method of sensing a physical feature of or along a path of a vehicle as recited in claim 13, wherein said at least one fan beam of light is projected forward of said vehicle, further comprising communicating said at least one elevation profile to a suspension control system of said vehicle so as to provide for controlling at least one element of a suspension system of said vehicle responsive to said at least one elevation profile along said portion of said path upon which said at least one tire of said vehicle is expected to travel, wherein the operation of communicating said at least one elevation profile to said suspension control system of said vehicle comprises communicating a differential path elevation series for tiles along at least one projected tire track within said at least one fan beam of light, wherein said differential path elevation series comprises a series of difference values, and each difference value of said series of difference values comprises a difference between elevation values of successive said tiles along said at least one projected tire track.

17. A method of sensing a physical feature of or along a path of a vehicle as recited in claim 16, further comprising determining a corresponding vertical acceleration series corresponding to said differential path elevation series and providing for controlling said at least one element of said suspension system responsive thereto.

18. A method of sensing a physical feature of or along a path of a vehicle as recited in any of claim 3, wherein said at least one fan beam of light is projected forward of said vehicle, further comprising communicating said at least one elevation profile to a suspension control system of said vehicle so as to provide for controlling at least one element of a suspension system of said vehicle responsive to said at least one elevation profile along said portion of said path upon which at least one tire of said vehicle is expected to travel.

19. A method of sensing a physical feature of or along a path of a vehicle as recited in claim 1, wherein said at least one fan beam of light is generated with light that is invisible to the human eye.

20. A method of sensing a physical feature of or along a path of a vehicle as recited in claim 1, wherein the operation of processing said at least one pair of stereo image components of said at least one fan beam of light comprises generating a corresponding at least one range map image from a corresponding said at least one pair of stereo image components, wherein the operation of sensing a physical feature of or along said path is responsive to said at least one range map image.

21. A system for sensing a physical feature of or along a path of a vehicle, comprising:
   a. a light projection system, wherein said light projection system is installed in the vehicle in an orientation so as to provide for projecting at least one fan beam of light onto a path upon which the vehicle can travel, wherein said at least one fan beam of light is oriented substantially along a direction of travel of said vehicle, each said at least one fan beam of light generates a corresponding at least one light stripe along a surface of said path, and said at least one fan beam of light is substantially aligned with a corresponding at least one corresponding tire track of said vehicle, so as to provide for said at least one fan beam of light to intersect said corresponding at least one corresponding tire track of said vehicle for a corresponding projected trajectory of said vehicle;
   b. an imaging system, wherein said imaging system generates at least one pair of stereo image components of said at least one fan beam of light; and
   c. an image processing system, wherein said image processing system is configured so as to sense a physical feature of or along said path of said vehicle responsive to said at least one pair of stereo image components of said at least one fan beam of light and responsive to stored reference information corresponding to said at least one fan beam of light.

22. A system for sensing a physical feature of or along a path of a vehicle as recited in claim 21, wherein said imaging system comprises first and second cameras separated along a baseline, and said baseline is oriented substantially transverse to said at least one fan beam of light.

23. A system for sensing a physical feature of or along a path of a vehicle as recited in claim 21, wherein said at least one fan beam of light is generated with infrared light.

24. A system for sensing a physical feature of or along a path of a vehicle as recited in claim 21, wherein said imaging system comprises either a stereo vision system or a plurality of cameras that either alone or in cooperation with said image processing system provide for generating a range-map image of said at least one fan beam of light projected onto said path.

25. A system for sensing a physical feature of or along a path of a vehicle as recited in claim 21, wherein said image processing system provides for sensing an elevation profile of said path along said at least one light stripe.

\* \* \* \* \*